US012518389B2

(12) United States Patent
Tsadok et al.

(10) Patent No.: US 12,518,389 B2
(45) Date of Patent: Jan. 6, 2026

(54) SYSTEMS AND METHODS FOR SELECTING AND DEDUPLICATING IMAGES OF EVENT INDICATORS

(71) Applicant: Given Imaging LTD., Yoqneam (IL)

(72) Inventors: Yossi Tsadok, Pardes Hanna-Karkur (IL); Dov Eilot, Yokneam (IL)

(73) Assignee: GIVEN IMAGING LTD., Yoqneam (IL)

( * ) Notice: Subject to any disclaimer, the term of this patent is extended or adjusted under 35 U.S.C. 154(b) by 355 days.

(21) Appl. No.: 17/914,788

(22) PCT Filed: Apr. 27, 2021

(86) PCT No.: PCT/IL2021/050492
§ 371 (c)(1),
(2) Date: Sep. 27, 2022

(87) PCT Pub. No.: WO2021/220279
PCT Pub. Date: Nov. 4, 2021

(65) Prior Publication Data
US 2023/0134603 A1    May 4, 2023

Related U.S. Application Data

(60) Provisional application No. 63/018,870, filed on May 1, 2020.

(51) Int. Cl.
*G06T 7/00* (2017.01)
*G16H 30/40* (2018.01)

(52) U.S. Cl.
CPC .......... *G06T 7/0016* (2013.01); *G16H 30/40* (2018.01); *G06T 2200/24* (2013.01);
(Continued)

(58) Field of Classification Search
CPC .............. G06T 7/0016; G06T 2200/24; G06T 2207/10068; G06T 2207/20084; G06T 2207/30032; G16H 30/40
See application file for complete search history.

(56) References Cited

U.S. PATENT DOCUMENTS

| | | | | |
|---|---|---|---|---|
| 9,430,706 | B1* | 8/2016 | Peleg | G06T 7/0012 |
| 2015/0095597 | A1* | 4/2015 | Ayanam | G06F 9/45558 |
| | | | | 711/162 |

FOREIGN PATENT DOCUMENTS

| | | |
|---|---|---|
| CN | 107767365 A | 3/2018 |
| EP | 3177015 A1 | 6/2017 |

(Continued)

OTHER PUBLICATIONS

Villard Benjamin et al. ("Colorectal Polyp Size Classification using a siamese network". Processing of Machine Learning Research, Apr. 17, 2019 (Apr. 17, 2019) (Year: 2019).*
(Continued)

*Primary Examiner* — Juan M Guillermety
(74) *Attorney, Agent, or Firm* — Carter, DeLuca & Farrell, LLP

(57) ABSTRACT

A system for selecting images of an event indicator includes a processor and a memory storing instructions which, when executed, cause the system to: access images of a portion of a gastrointestinal tract captured by a capsule endoscopy device; for each of the images, access one or more scores indicating a presence of an event indicator; select seed images from among the images based on the one or more scores; deduplicate the seed images for images showing the same occurrence of the event indicator, where the deduplicating utilizes a consecutive-image tracker; and present the deduplicated seed images in a graphical user interface to display potential occurrences of the event indicator.

15 Claims, 14 Drawing Sheets

(52) U.S. Cl.
CPC ............... *G06T 2207/10068* (2013.01); *G06T 2207/20084* (2013.01); *G06T 2207/30032* (2013.01)

(56) References Cited

FOREIGN PATENT DOCUMENTS

| | | |
|---|---|---|
| EP | 3705025 A1 | 9/2020 |
| WO | 2019088121 A1 | 5/2019 |

OTHER PUBLICATIONS

International Search Report and Written Opinion of the International Searching Authority issued in corresponding application PCT/IL2021/050492 mailed Jul. 29, 2021 (10 pages).
European Examination Report for European application No. 21 726 728.5 dated Oct. 24, 2025, 10 pages.

\* cited by examiner

SYSTEMS AND METHODS FOR SELECTING AND DEDUPLICATING IMAGES OF EVENT INDICATORS

CROSS-REFERENCE TO RELATED APPLICATIONS

The present application is a U.S. National Stage Application filed under 35 U.S.C. § 371(a) of International Patent Application No. PCT/IL2021/050492, filed Apr. 27, 2021, which claims the benefit of and priority to U.S. Provisional Application No. 63/018,870, filed May 1, 2020, both of which are hereby incorporated by reference herein in their entirety.

FIELD

The disclosure relates to image analysis of a stream of in-vivo images of a gastrointestinal tract (GU) and, more particularly, to systems and methods for selecting images of event indicators in a GIT.

BACKGROUND

Capsule endoscopy (CE) allows examining the entire GU endoscopically. There are capsule endoscopy systems and methods that are aimed at examining a specific portion of the GIT, such as the small bowel (SB) or the colon. CE is a non-invasive procedure which does not require the patient to be admitted to a hospital, and the patient can continue most daily activities while the capsule is in his body.

On a typical CE procedure, the patient is referred to a procedure by a physician. The patient then arrives at a medical facility (e.g., a clinic or a hospital), to perform the procedure. The capsule, which is about the size of a multivitamin, is swallowed by the patient under the supervision of a health professional (e.g., a nurse or a physician) at the medical facility and the patient is provided with a wearable device, e.g., a sensor belt and a recorder placed in a pouch and strap to be placed around the patient's shoulder. The wearable device typically includes a storage device. The patient may be given guidance and/or instructions and then released to his daily activities.

The capsule captures images as it travels naturally through the GU. Images and additional data (e.g., metadata) are then transmitted to the recorder that is worn by the patient. The capsule is typically disposable and passes naturally with a bowel movement. The procedure data (e.g., the captured images or a portion of them and additional metadata) is stored on the storage device of the wearable device.

The wearable device is typically returned by the patient to the medical facility with the procedure data stored thereon. The procedure data is then downloaded to a computing device typically located at the medical facility, which has an engine software stored thereon. The received procedure data is then processed by the engine to a compiled study (or "study"). Typically, a study includes thousands of images (around 6,000). Typically, the number of images to be processed is of the order of tens of thousands and about 90,000 on average.

A reader (which may be the procedure supervising physician, a dedicated physician, or the referring physician) may access the study via a reader application. The reader then reviews the study, evaluates the procedure, and provides his input via the reader application. Since the reader needs to review thousands of images, the reading time of a study may usually take between half an hour to an hour on average and the reading task may be tiresome. A report is then generated by the reader application based on the compiled study and the reader's input. On average, it would take an hour to generate a report. The report may include, for example, images of interest, e.g., images which are identified as including pathologies, selected by the reader; evaluation or diagnosis of the patient's medical condition based on the procedure's data (i.e., the study) and/or recommendations for follow up and/or treatment provided by the reader. The report may be then forwarded to the referring physician. The referring physician may decide on a required follow up or treatment based on the report.

SUMMARY

To the extent consistent, any or all of the aspects detailed herein may be used in conjunction with any or all of the other aspects detailed herein. Aspects of the present disclosure relate to use of a tracker to detect images which present the same event. By identifying images displaying the same appearance of or the same event indicator (e.g., pathology such as a colon polyp), the number of images which represent an appearance of an event indicator can be decreased and the number of images in a study overall can be reduced. Aspects of the present disclosure also relate to using an ICY detector as a false detection filter.

In accordance with aspects of the present disclosure, a system for selecting images of an event indicator includes at least one processor and at least one memory storing instructions. The instructions, when executed by the at least one processor, cause the system to: access a plurality of images of at least a portion of a gastrointestinal tract (GIT) captured by a capsule endoscopy device; for each image of the plurality of images, access one or more scores for indicating a presence of an event indicator; select a plurality of seed images from among the plurality of images based on the one or more scores; deduplicate the plurality of seed images for images showing a same occurrence of the event indicator, where the deduplicating utilizes a consecutive-image tracker; and present the deduplicated seed images in a graphical user interface to display potential occurrences of the event indicator.

In various embodiments of the system, in deduplicating the plurality of seed images, the instructions, when executed by the at least one processor, cause the system to: for each seed image of the plurality seed images: identify, using the consecutive-image tracker, a track for an occurrence of an event indicator stemming from the seed image; determine whether two tracks among the tracks merge together; and in a case the two tracks merge together, retain only one track of the two tracks and the seed image corresponding to the one track.

In various embodiments of the system, in deduplicating the plurality of seed images, the instructions, when executed by the at least one processor, cause the system to: apply the consecutive-image tracker to at least two seed images of the plurality of seed images which are not contained in a same track; determine, based on the consecutive-image tracker, whether a same occurrence of the event indicator is tracked in the at least two seed images; and in a case the same occurrence of the event indicator is tracked in the at least two seed images, retain only one seed image of the at least two seed images to deduplicate the at least two seed images.

In various embodiments of the system, the instructions, when executed by the at least one processor, further cause the system to: access a false detection filter results for each image of the tracks; determine that a track among the tracks contains a false detection of an occurrence of the event indicator; and remove the track containing the false detection and the seed image corresponding to the track containing the false detection.

In various embodiments of the system, the event indicator is a colon polyp, the false detection filter is an ileocecal valve detector, and the false detection is an incorrect classification of an ileocecal valve as a colon polyp.

In accordance with aspects of the present disclosure, a computer-implemented method for selecting images of an event indicator includes: accessing a plurality of images of at least a portion of a gastrointestinal tract (GIT) captured by a capsule endoscopy device; for each image of the plurality of images, accessing one or more scores indicating a presence of an event indicator; selecting a plurality of seed images from among the plurality of images based on the one or more scores; deduplicating the plurality of seed images for images showing a same occurrence of the event indicator, where the deduplicating utilizes a consecutive-image tracker; and presenting the deduplicated seed images in a graphical user interface to display potential occurrences of the event indicator.

In various embodiments of the computer-implemented method, deduplicating the plurality of seed images includes: for each seed image of the plurality seed images: identifying, using the consecutive-image tracker, a track for an occurrence of an event indicator stemming from the seed image; determining whether two tracks among the tracks merge together; and in a case the two tracks merge together, retaining only one track of the two tracks and the seed image corresponding to the one track.

In various embodiments of the computer-implemented method, deduplicating the plurality of seed images includes: applying the consecutive-image tracker to at least two seed images of the plurality of seed images which are not contained in a same track; determining, based on the consecutive-image tracker, whether a same occurrence of the event indicator is tracked in the at least two further seed images; and in a case the same occurrence of the event indicator is tracked in the at least two seed images, retaining only one seed image of the at least two seed images to deduplicate the at least two seed images.

In various embodiments of the computer-implemented method, the computer-implemented method includes: accessing a false detection filter result for each image of the tracks; determining that a track among the tracks contains a false detection of an occurrence of the event indicator; and removing the track containing the false detection and the seed image corresponding to the track containing the false detection.

In various embodiments of the computer-implemented method, the event indicator is a colon polyp, the false detection filter is an ileocecal valve detector, and the false detection is an incorrect classification of an ileocecal valve as a colon polyp.

In accordance with aspects of the present disclosure, a non-transitory computer readable medium stores machine readable instructions which, when executed by at least one processor of a system, causes the system to perform a process. The process includes: accessing a plurality of images of at least a portion of a gastrointestinal tract (GIT) captured by a capsule endoscopy device; for each image of the plurality of images, accessing one or more scores indicating a presence of an event indicator; selecting a plurality of seed images from among the plurality of images based on the one or more scores; deduplicating the plurality of seed images for images showing a same occurrence of the event indicator, where the deduplicating utilizes a consecutive-image tracker; and presenting the deduplicated seed images in a graphical user interface to display potential occurrences of the event indicator.

In various embodiments of the non-transitory computer readable medium, in deduplicating the plurality of seed images, the instructions, when executed by the at least one processor, cause the system to: for each seed image of the plurality seed images: identify, using the consecutive-image tracker, a track for an occurrence of an event indicator stemming from the seed image; determine whether two tracks among the tracks merge together; and in a case the two tracks merge together, retain only one track of the two tracks and the seed image corresponding to the one track.

In various embodiments of the non-transitory computer readable medium, in deduplicating the plurality of seed images, the instructions, when executed by the at least one processor, cause the system to: apply the consecutive-image tracker to at least two seed images of the plurality of seed images which are not contained in a same track; determine, based on the consecutive-image tracker, whether a same occurrence of the event indicator is tracked in the at least two seed images; and in a case the same occurrence of the event indicator is tracked in the at least two seed images, retain only one seed image of the at least two seed images to deduplicate the at least two seed images.

In various embodiments of the non-transitory computer readable medium, the instructions, when executed by the at least one processor, cause the system to perform operations including: accessing a false detection filter result for each image of the tracks; determining that a track among the tracks contains a false detection of an occurrence of the event indicator; and removing the track containing the false detection and the seed image corresponding to the track containing the false detection.

In various embodiments of the non-transitory computer readable medium, the event indicator is a colon polyp, the false detection filter is an ileocecal valve detector, and the false detection is an incorrect classification of an ileocecal valve as a colon polyp.

Further details and aspects of exemplary embodiments of the present disclosure are described in more detail below with reference to the appended figures.

BRIEF DESCRIPTION OF DRAWINGS

The above and other aspects and features of the disclosure will become more apparent in view of the following detailed description when taken in conjunction with the accompanying drawings wherein like reference numerals identify similar or identical elements.

DETAILED DESCRIPTION

Figure 1:
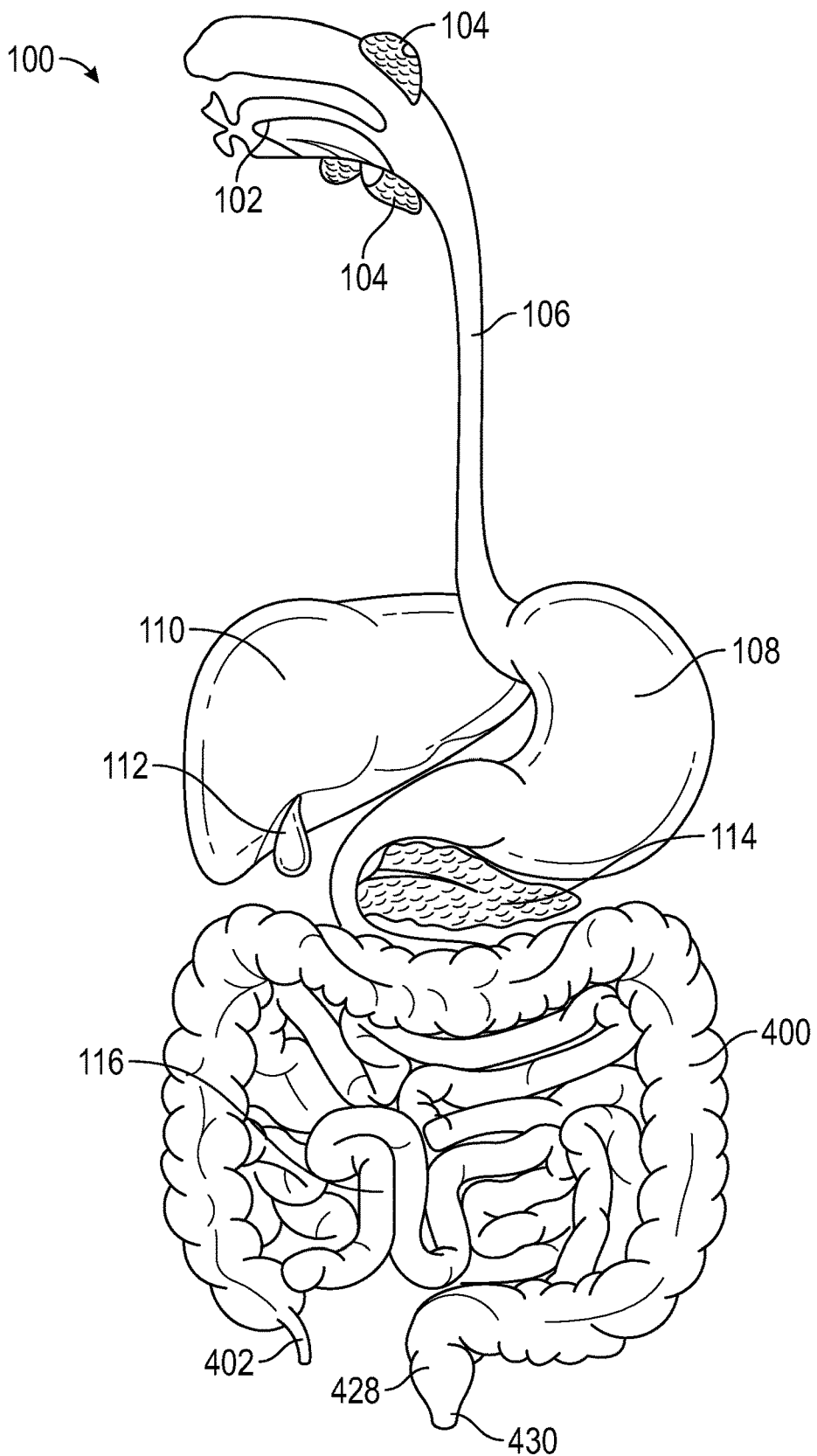
FIG. 1 is a diagram illustrating a gastrointestinal tract (GIT)

The present disclosure relates to systems and methods for selecting images of event indicators in a GIT based on images of a GU captured in vivo by a capsule endoscopy (CE) device, and more particularly, to identifying particular images which may include an event indicator and efficiently presenting such images to a medical professional. As used herein, the term "event indicator" means and includes an indicator of an event in a GIT, such as an indicator of a pathology, internal bleeding, a foreign body or material, parasites, an indicator of potential cancerous growth (such as a colon polyp), ulcer, angioectasia, diverticulum, or mass, among other things. Other aspects of the present disclosure apply a tracker to consecutive images. As used herein, the phrase "consecutive images" means and includes images which, when ordered in a sequence, are adjacent to each other in the sequence.

In the following detailed description, specific details are set forth in order to provide a thorough understanding of the disclosure. However, it will be understood by those skilled in the art that the disclosure may be practiced without these specific details. In other instances, well-known methods, procedures, and components have not been described in detail so as not to obscure the present disclosure. Some features or elements described with respect to one system may be combined with features or elements described with respect to other systems. For the sake of clarity, discussion of same or similar features or elements may not be repeated.

Although the disclosure is not limited in this regard, discussions utilizing terms such as, for example, "processing," "computing," "calculating," "determining," "establishing," "analyzing," "checking," or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although the disclosure is not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the methods described herein are not constrained to a particular order or sequence. Additionally, some of the described methods or elements thereof can occur or be performed simultaneously, at the same point in time, or concurrently.

The term "location" and its derivatives, as referred to herein with respect to an image, may refer to the estimated location of the capsule along the GU while capturing the image or to the estimated location of the portion of the GIT shown in the image along the GU.

A type of CE procedure may be determined based on, inter alia, the portion of the GIT that is of interest and is to be imaged (e.g., the colon or the small bowel ("SB")), or based on the specific use (e.g., for checking the status of a GI disease, such as Crohn's disease, or for colon cancer screening).

The terms screen(s), view(s) and display(s) may be used herein interchangeably and may be understood according to the specific context.

The terms "surrounding" or "adjacent" as referred to herein with respect to images (e.g., images that surround another image(s), or that are adjacent to other image(s)), may relate to spatial and/or temporal characteristics unless specifically indicated otherwise. For example, images that surround or are adjacent to other image(s) may be images that are estimated to be located near the other image(s) along the GIT and/or images that were captured near the capture time of another image, within a certain threshold, e.g., within one or two centimeters, or within one, five, or ten seconds.

The terms "GU" and "a portion of the GIT" may each refer to or include the other, according to their context. Thus, the term "a portion of the GIT" may also refer to the entire GIT and the term "GU" may also refer only to a portion of the GU.

The terms "image" and "frame" may each refer to or include the other and may be used interchangeably in the present disclosure to refer to a single capture by an imaging device. For convenience, the term "image" may be used more frequently in the present disclosure, but it will be understood that references to an image shall apply to a frame as well.

The term "classification score(s)" or "score(s)" may be used throughout the specification to indicate a value or a vector of values for a category or a set of categories applicable to an image/frame. In various implementations, the value or vector of values of a classification score or classification scores may be or may reflect probabilities. In various embodiments, a model may output classification scores which may be probabilities. In various embodiments, a model may output classification scores which may not be probabilities.

The term "classification probabilities" may be used to describe classification scores which are probabilities or to describe a transformation of classification scores which are not probabilities into values which reflect the probabilities that each category of the set of categories applies to the image/frame. It will be understood from context that various references to "probability" refer to and are a shorthand for a classification probability.

As used herein, a "machine learning system" means and includes any computing system that implements any type of machine learning. As used herein, "deep learning neural network" refers to and includes a neural network having several hidden layers and which does not require feature selection or feature engineering. A "classical" machine learning system, in contrast, is a machine learning system which requires feature selection or feature engineering.

Referring to FIG. 1, an illustration of the GIT 100 is shown. The GIT 100 is an organ system within humans and other animals. The GIT 100 generally includes a mouth 102 for taking in sustenance, salivary glands 104 for producing saliva, an esophagus 106 through which food passes aided by contractions, a stomach 108 to secret enzymes and stomach acid to aid in digesting food, a liver 110, a gall bladder 112, a pancreas 114, a small intestine/small bowel 116 ("SB") for the absorption of nutrients, and a colon 400 (e.g., large intestine) for storing water and waste material as feces prior to defecation. The colon 400 generally includes an appendix 402, a rectum 428, and an anus 430. Food taken in through the mouth is digested by the GIT to take in nutrients and the remaining waste is expelled as feces through the anus 430.

Studies of different portions of the GIT 100 (e.g., colon 400, esophagus 106, and/or stomach 108) may be presented via a suitable user interface. As used herein, the term "study" refers to and includes at least a set of images selected from the images captured by a CE imaging device (e.g., 212, FIG. 2) during a single CE procedure performed with respect to a specific patient and at a specific time, and can optionally include information other than images as well. The type of procedure performed may determine which portion of the GIT 100 is the portion of interest. Examples of types of procedures performed include, without limitation, a small bowel procedure, a colon procedure, a small bowel and colon procedure, a procedure aimed to specifically exhibit or check the small bowel, a procedure aimed to specifically exhibit or check the colon, a procedure aimed to specifically exhibit or check the colon and the small bowel, or a procedure to exhibit or check the entire GIT: esophagus, stomach, SB, and colon.

Figure 2:
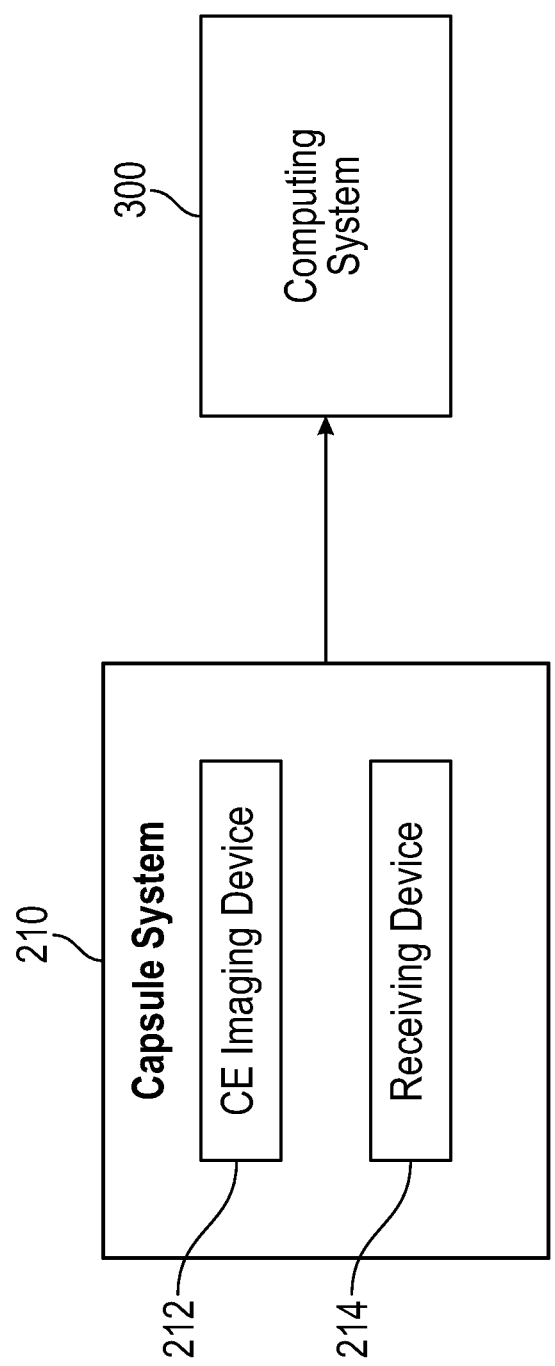
FIG. 2 is a block diagram of an exemplary system for analyzing medical images captured in vivo via a Capsule Endoscopy (CE) procedure, in accordance with aspects of the disclosure.

FIG. 2 shows a block diagram of a system for analyzing medical images captured in vivo via a CE procedure. The system generally includes a capsule system 210 configured to capture images of the GU and a computing system 300 (e.g., local system and/or cloud system) configured to process the captured images.

The capsule system 210 may include a swallowable CE imaging device 212 (e.g., a capsule) configured to capture images of the GIT as the CE imaging device 212 travels through the GIT. In various embodiments, the CE imaging device 212 may have a single imaging sensor. In various embodiments, the CE imaging device 212 may have more than one imaging sensor, such as two imaging sensors. For example, the CE imaging device 212 may have the form of a capsule and both ends of the capsule may have an imaging sensor. The images captured by the CE imaging device 212 may be stored on the CE imaging device 212 and/or transmitted to a receiving device 214 typically including an antenna. In various embodiments involving multiple imaging sensors, the images captured by each imaging sensor may be identified and may be distinguished from images captured by any other imaging sensor. In some capsule systems 210, the receiving device 214 may be located on the patient who swallowed the CE imaging device 212 and may, for example, take the form of a belt worn by the patient or a patch secured to the patient.

The capsule system 210 may be communicatively coupled with the computing system 300 and can communicate captured images to the computing system 300. The computing system 300 may process the received images using image processing technologies, machine learning technologies, and/or signal processing technologies, among other technologies. The computing system 300 can include local computing devices that are local to the patient and/or the patient's treatment facility, a cloud computing platform that is provided by cloud services, or a combination of local computing devices and a cloud computing platform.

In the case where the computing system 300 includes a cloud computing platform, the images captured by the capsule system 210 may be transmitted online to the cloud computing platform. In various embodiments, the images can be transmitted via the receiving device 214 worn or carried by the patient. In various embodiments, the images can be transmitted via the patient's smartphone or via any other device connected to the Internet and which may be coupled with the CE imaging device 212 or the receiving device 214.

Figure 3:
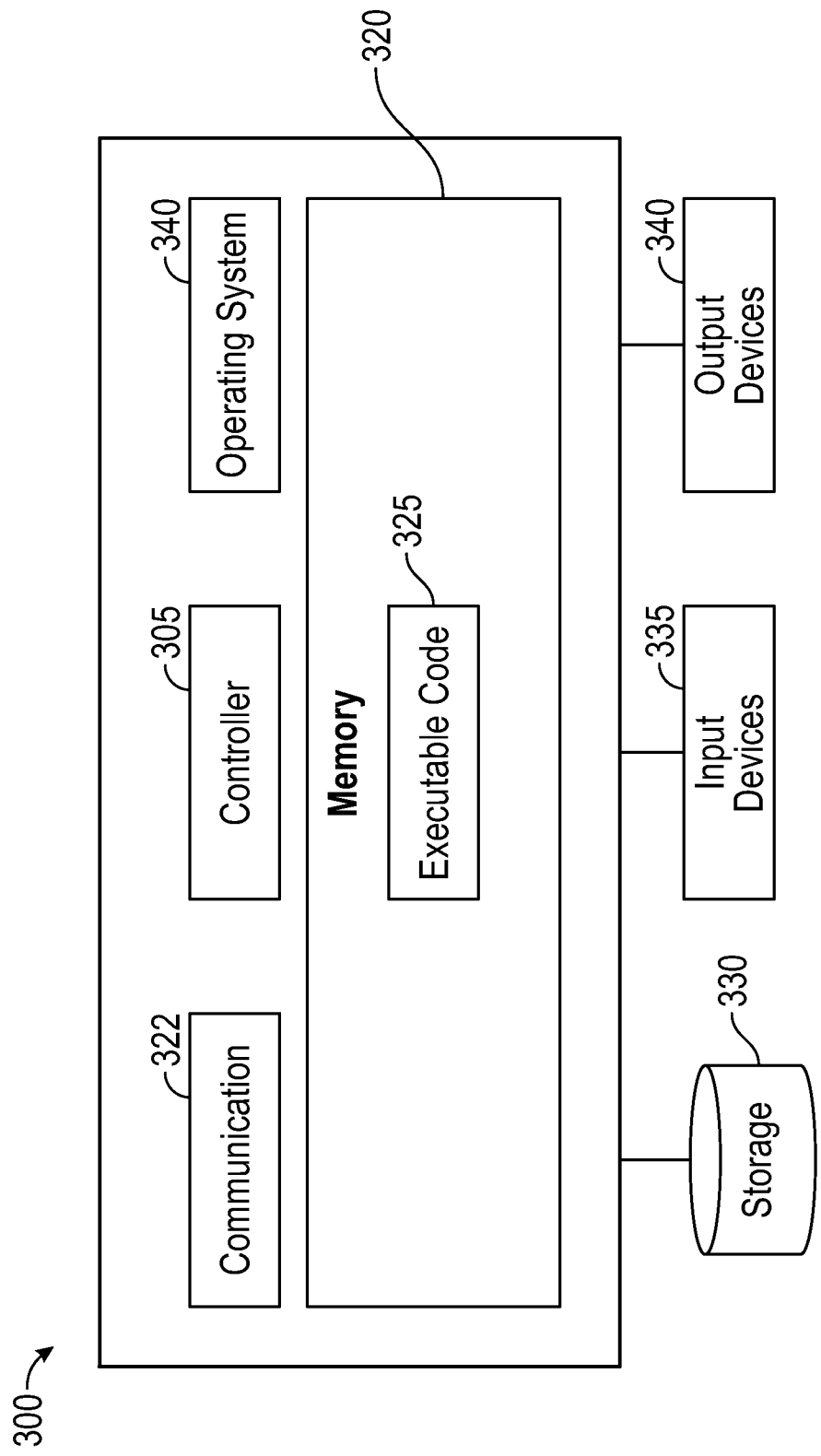
FIG. 3 is a block diagram of an exemplary computing system which may be used with the systems of the disclosure.

FIG. 3 shows a high-level block diagram of an exemplary computing system 300 that may be used with image analyzing systems of the present disclosure. Computing system 300 may include a processor or controller 305 that may be or include, for example, one or more central processing unit processor(s) (CPU), one or more Graphics Processing Unit(s) (GPU or GPGPU), a chip or any suitable computing or computational device, an operating system 215, a memory 320, a storage 330, input devices 335 and output devices 340. Modules or equipment for collecting or receiving (e.g., a receiver worn on a patient) or displaying or selecting for display (e.g., a workstation) medical images collected by the CE imaging device 212 (FIG. 2) may be or include, or may be executed by, the computing system 300 shown in FIG. 3. A communication component 322 of the computing system 300 may allow communications with remote or external devices, e.g., via the Internet or another network, via radio, or via a suitable network protocol such as File Transfer Protocol (FTP), etc.

The computing system 300 includes an operating system 315 that may be or may include any code segment designed and/or configured to perform tasks involving coordination, scheduling, arbitration, supervising, controlling or otherwise managing operation of computing system 300, for example, scheduling execution of programs. Memory 320 may be or may include, for example, a Random Access Memory (RAM), a read-only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 320 may be or may include a plurality of possibly different memory units. Memory 320 may store for example, instructions to carry out a method (e.g., executable code 325), and/or data such as user responses, interruptions, etc.

Executable code 325 may be any executable code, e.g., an application, a program, a process, task, or script. Executable code 325 may be executed by controller 305 possibly under control of operating system 315. For example, execution of executable code 325 may cause the display or selection for display of medical images as described herein. In some systems, more than one computing system 300 or components of computing system 300 may be used for multiple functions described herein. For the various modules and functions described herein, one or more computing systems 300 or components of computing system 300 may be used. Devices that include components similar or different to those included in the computing system 300 may be used and may be connected to a network and used as a system. One or more processor(s) 305 may be configured to carry out methods of the present disclosure by for example executing software or code. Storage 330 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, medical images, image streams, etc. may be stored in storage 330 and may be loaded from storage 330 into memory 320 where it may be processed by controller 305. In some embodiments, some of the components shown in FIG. 3 may be omitted.

Input devices 335 may include for example a mouse, a keyboard, a touch screen or pad or any suitable input device. It will be recognized that any suitable number of input devices may be operatively coupled to computing system 300. Output devices 340 may include one or more monitors, screens, displays, speakers and/or any other suitable output devices. It will be recognized that any suitable number of output devices may be operatively coupled to computing system 300 as shown by block 340. Any applicable input/output (I/O) devices may be operatively coupled to computing system 300, for example, a wired or wireless network interface card (NIC), a modem, printer or facsimile machine, a universal serial bus (USB) device or external hard drive may be included in input devices 335 and/or output devices 340.

Multiple computer systems 300 including some or all of the components shown in FIG. 3 may be used with the described systems and methods. For example, a CE imaging device 212, a receiver, a cloud-based system, and/or a workstation or portable computing device for displaying images may include some or all of the components of the computer system of FIG. 3. A cloud platform (e.g., a remote server) including components such as computing system 300 of FIG. 3 may receive procedure data such as images and metadata, processes and generate a study, and may also display the generated study for the doctor's review (e.g., on a web browser executed on a workstation or portable computer). An "on-premises" option, may use a workstation or local server of a medical facility to store, process and display images and/or a study.

According to some aspects of the present disclosure, a user (e.g., a physician), may build his or her understanding of a case by reviewing a study, e.g., a display of images (e.g., captured by the CE imaging device 212) that were selected, e.g., automatically, as images that may be of interest. In some systems of the present disclosure, a relatively small number of images from the captured images are displayed for the user's review per case. By "relatively small number" it is meant on the order of hundreds at most or at least at average as opposed to current methods, which display a video stream of images that typically includes thousands of images per a case (e.g., around 6,000 images). In some systems, only up to a few hundreds of images are displayed for the user's review. In some systems, the number of images displayed for the user's review is up to an order of 1,000. Browsing through a relatively small number of images, as opposed to watching or reviewing thousands of images, may significantly ease the review process for the user, reduce the reading time per case and may lead to better diagnosis. Aspects of exemplary user interfaces for displaying a study are described in co-pending International Patent Application Publication No. WO/2020/079696, entitled "Systems and Methods for Generating and Displaying a Study of a Stream of In-Vivo Images," which is hereby incorporated by reference in its entirety. Other aspects of the computing system 300 and the capsule system (210, FIG. 2) are described in U.S. Provisional Application No. 62/867,050, entitled "Systems and Methods For Capsule Endoscopy Procedure," which is hereby incorporated by reference in its entirety.

Figure 4:
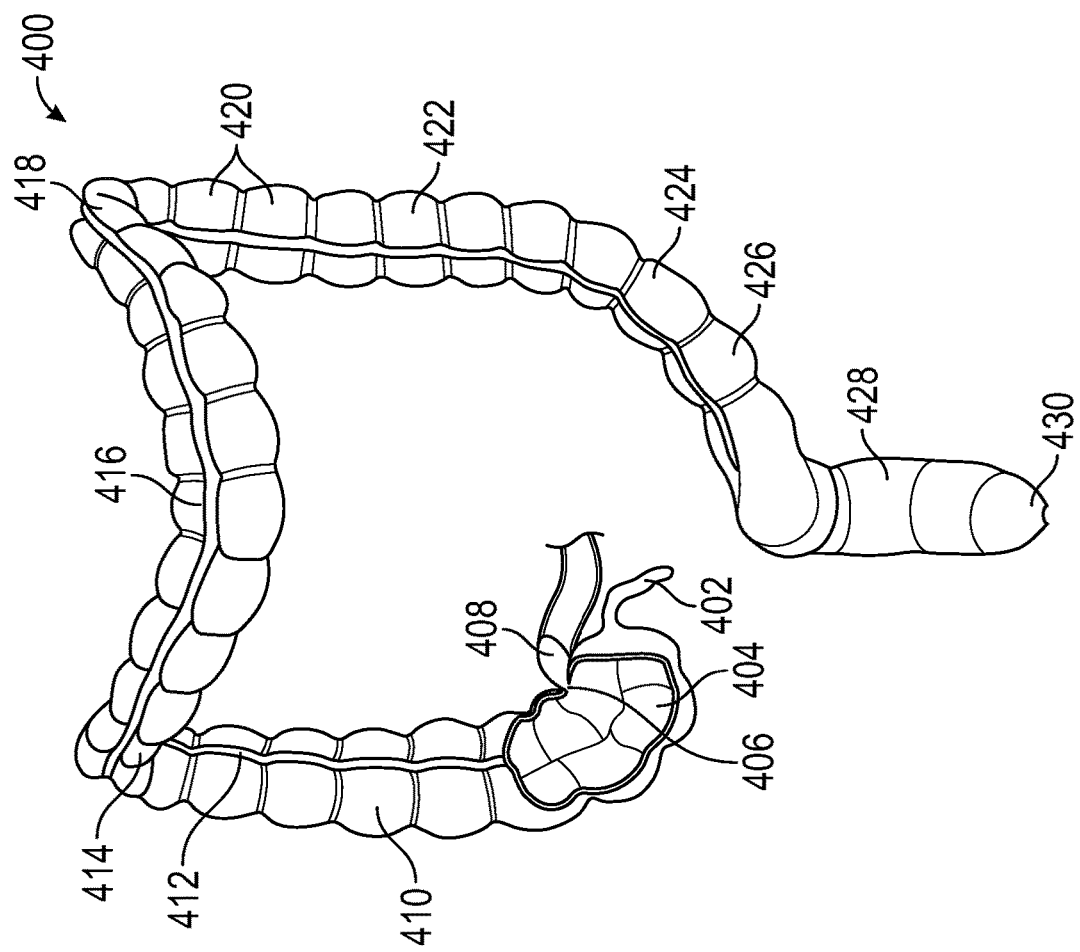
FIG. 4 is a diagram illustrating a large intestine.
Figure 4:
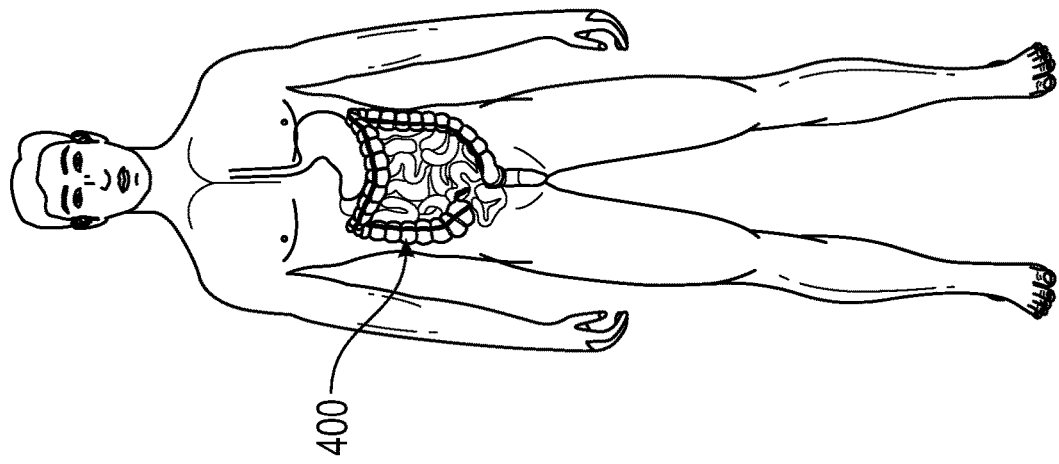

With reference to FIG. 4 an illustration of the colon 400 is shown. The colon 400 absorbs water and any remaining waste material is stored as feces before being removed by defecation. The colon 400 may be divided, for example, into five anatomical segments: cecum 404, right or ascending colon 410, transverse colon 416, left or descending colon 422 (e.g., left colon-sigmoid 424), and rectum 428.

An ileum 408 is the final section of the small bowel and leads to the cecum 404 and is separated from the cecum 404 by a muscle valve called the ileocecal valve (ICV) 406. The cecum 404 is the first section of the colon 400. The cecum 404 includes the appendix 402. The next portion of the colon 400 is the ascending colon 410. The ascending colon 410 is connected to the small bowel by the cecum 404. The ascending colon 410 runs upwards through the abdominal cavity toward the transverse colon 416.

The transverse colon 416 is the part of the colon 400 from the hepatic flexure, also known as the right colic flexure 414, (the turn of the colon 400 by the liver) to the splenic flexure also known as the left colic flexure 418, (the turn of the colon 400 by the spleen). The transverse colon 416 hangs off the stomach, attached to it by a large fold of peritoneum called the greater omentum. On the posterior side, the transverse colon 416 is connected to the posterior abdominal wall by a mesentery known as the transverse mesocolon.

The descending colon 422 is the part of the colon 400 from the left colic flexure 418 to the beginning of the sigmoid colon 426. One function of the descending colon 422 in the digestive system is to store feces that will be emptied into the rectum. The descending colon 422 is also called the distal gut, as it is further along the gastrointestinal tract than the proximal gut. Gut flora is generally very dense in this region. The sigmoid colon 426 is the part of the colon 400 after the descending colon 422 and before the rectum 428. The name sigmoid means S-shaped. The walls of the sigmoid colon 426 are muscular, and contract to increase the pressure inside the colon 400, causing the stool to move into the rectum 428. The sigmoid colon 426 is supplied with blood from several branches (usually between 2 and 6) of the sigmoid arteries.

The rectum 428 is the last section of the colon 400. The rectum 428 holds the formed feces awaiting elimination via defecation.

The CE imaging device 212 (FIG. 2) may be used to image the interior of the colon 400. The entrance from the small bowel into the colon 400 happens through the ICV 406. Usually after entering the colon 400 through the ICV 406, the CE imaging device 212 goes into the cecum 404. However, occasionally, the CE imaging device 212 misses the cecum 404 and goes straight into the ascending colon 410. The colon 400 may be wide enough to enable almost unrestricted CE imaging device 212 movement. The CE imaging device 212 may rotate and roll. The CE imaging device 212 may rest in one place for a long period of time, or it may move very fast through the colon 400.

In general, the division of the GIT into anatomical segments may be performed, for example, based on the identification of the CE imaging device 212 passage between the different anatomical segments. Such identification may be performed, for example, based on machine learning techniques. Segmentation of GIT images into GIT portions is addressed in U.S. provisional patent application No. 63/018,890, and segmentation of colon images into colon portions is addressed in U.S. provisional patent application No. 63/018,878. The entire contents of both copending patent applications are hereby incorporated by reference.

The following description relates to images of a colon captured by a capsule endoscopy device. Such colon images may part of a stream of images of the GIT and may be picked out from the stream of GIT images using the technology of the copending applications or using other methodologies which persons skilled in the art would recognize. Colon images are used merely as an example of the aspects and embodiments described below. The embodiments and aspects described herein also apply to other portions of a GIT, and it is intended that any description related to colon images shall be applicable to images of other portions of a GIT.

Figure 5:
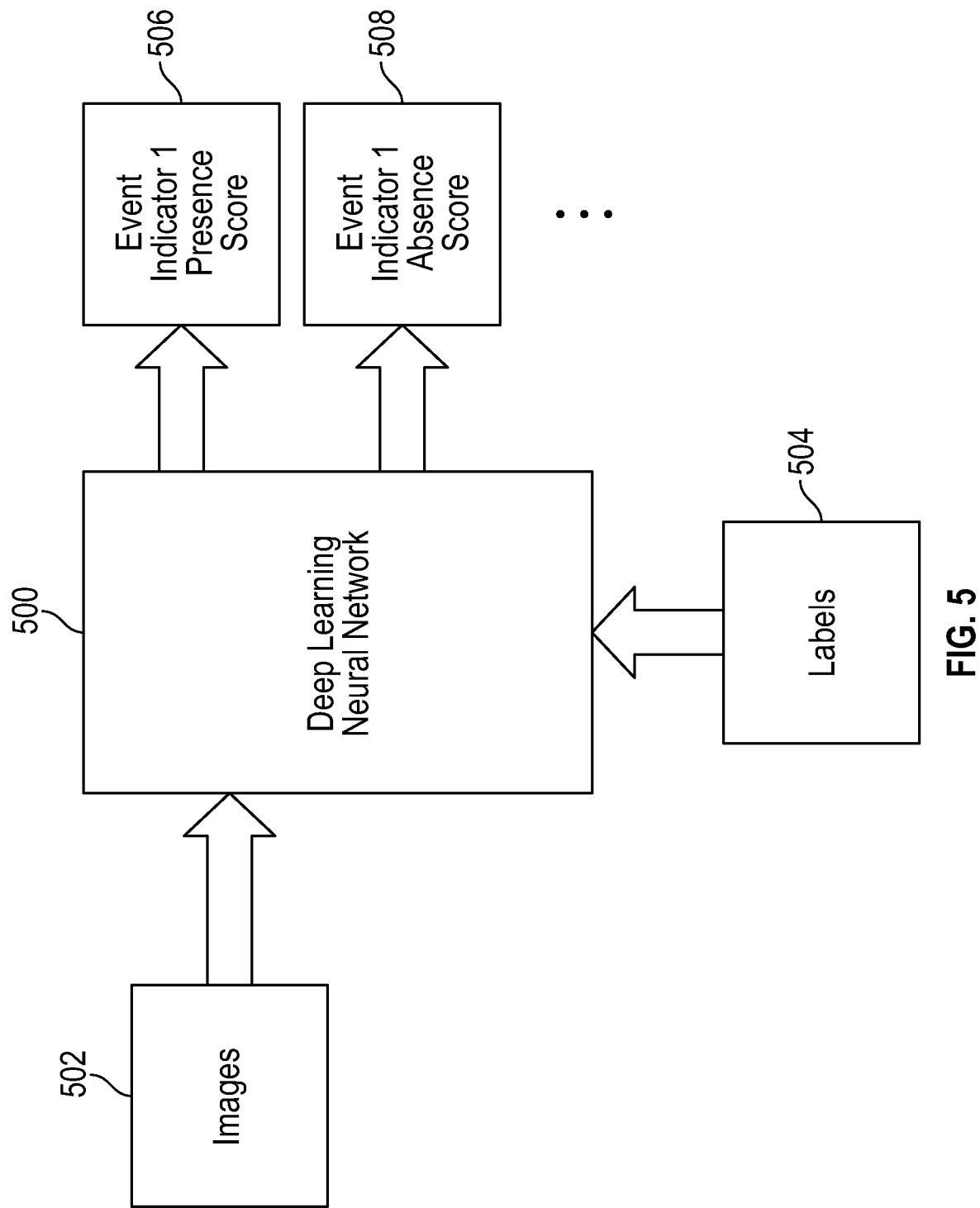
FIG. 5 is a diagram of an exemplary deep learning neural network, in accordance with aspects of the disclosure.

With reference to FIG. 5, a block diagram for a deep learning neural network 500 for classifying images is shown in accordance with some aspects of the disclosure. In various embodiments, the images 502 may be colon images. In various embodiments, the images 502 may be images of one or more portions of a GIT. In some systems, a deep learning neural network 500 may include a convolutional neural network (CNN) and/or a recurrent neural network. Generally, a deep learning neural network includes multiple hidden layers. As explained in more detail below, the deep learning neural network 500 may leverage one or more CNNs to classify one or more colon images, taken by the CE imaging device 212 (see FIG. 2), for presence of one or more event indicators 506 and absence of one or more event indicators 508, such as presence and/or absence of a colon polyp or colon bleeding. The deep learning neural network 500 may be executed on the computer system 300 (FIG. 3). Persons skilled in the art will understand the deep learning neural network 500 and how to implement it. Various deep learning neural networks can be used, including, without limitation, MobileNet or Inception.

In machine learning, a CNN is a class of artificial neural network (ANN) that is most commonly applied to analyzing visual imagery. The convolutional aspect of a CNN relates to applying matrix processing operations to localized portions of an image, and the results of those operations (which can involve dozens of different parallel and serial calculations) are sets of many features that are used to train neural networks. A CNN typically includes convolution layers, activation function layers, and pooling (typically max pooling) layers to reduce dimensionality without losing too many features. Additional information may be included in the operations that generate these features. Providing unique information that yields features that give the neural networks information can be used to ultimately provide an aggregate way to differentiate between different data input to the neural networks.

The deep learning neural network 500 may be trained based on labeling training images and/or objects in training images. For example, an image may have a label 504 for presence or absence of an event indicator, such as presence or absence of a colon polyp or colon bleeding, among others things. The training further may include augmenting the training images to include adding noise, changing colors, hiding portions of the training images, scaling of the training images, rotating the training images, and/or stretching the training images. Persons skilled in the art will understand training the deep learning neural network 500 and how to implement the training.

In some embodiments, in accordance with the present disclosure, the deep learning neural network 500 may be used to classify colon images 502 captured by the CE imaging device 212 (see FIG. 2). The classification of the colon images 502 may include each image being classified for presence of a colon polyp 506 and for absence of a colon polyp 508. The deep learning neural network 500 can provide, for each of the colon images 502, a classification score for presence of a colon polyp 506 and a classification score for absence of a colon polyp 508. In various embodiments, the deep learning neural network 500 may provide classification scores for presence and/or absence of other event indicators as well, such as presence and/or absence of colon bleeding, among other things.

In various embodiments, two deep learning neural networks (not shown) can operate to classify GU images (such as colon images) and provide classification scores. For example, one deep learning neural network may be configured to provide classification scores with moderate true positive rate and lower false positive rates, while the other deep learning neural network may be configured to provide classification scores with better true positive rate and higher false positive rates. The classification scores of the two deep learning neural networks can be averaged to provide an averaged classification score for presence of an event indicator and an averaged classification score for absence of an event indicator. In various embodiments, more than two deep learning neural networks can be used, and their classification scores can be combined in various ways. In various embodiments, the classification scores can be combined and normalized to provide a probability that an event indicator is present in an image and/or to provide a probability that an event indicator is absent in an image. Persons skilled in the art will understand various ways for combining classification scores and for normalizing scores to provide normalized scores or probabilities.

The illustrative embodiment of FIG. 5 for classifying images is exemplary, and other ways of classifying images are contemplated to be within the scope of the present disclosure. For example, in various embodiments, unsupervised learning or another type of learning may be used. In various embodiments, the classification can be performed by various configurations of deep learning neural networks, by machine learning systems that are not deep learning neural networks, and/or by classification techniques which persons skilled in the art will recognize. Such variations are contemplated to be within the scope of the present disclosure.

Figure 6:
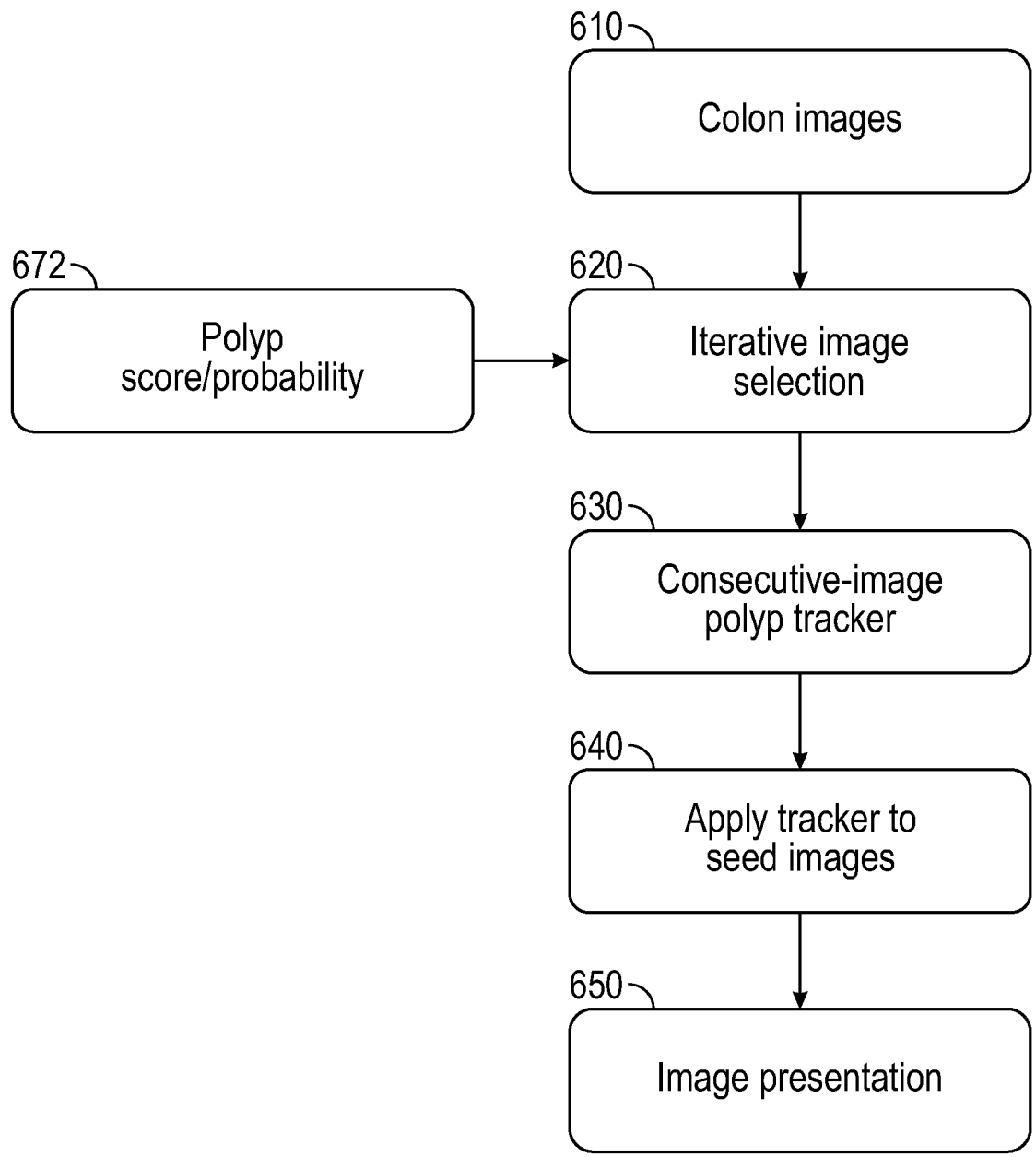
FIG. 6 is a flow diagram of an exemplary operation for selecting colon images which may contain a colon polyp, in accordance with aspects of the present disclosure.

With reference to FIG. 6, there is shown a flow diagram of an exemplary operation for identifying images which may contain an event indicator. The example of FIG. 6 is illustrated for processing colon images to identify images of colon polyps. However, the illustration is merely exemplary, and the disclosed aspects can be applied to identifying other event indicators in colon images and/or identifying event indicators in images of other GIT portions. The operation of FIG. 6 may be applied to a stream of images captured by an imaging device, such as, without limitation, the CE imaging device 212 of FIG. 2. When the imaging device includes multiple imaging sensors and the captured images are captured such that each imaging sensor provides a separate stream of images, the operation of FIG. 6 may be applied separately to each image stream of each imaging sensor.

At block 610, the operation accesses colon images that have been classified based on one or more deep learning neural networks, such as the deep learning neural network of FIG. 5. The operation also accesses the classification scores or probabilities 672 for each colon image resulting from the deep learning neural network(s). The scores or probabilities can be generated in the manners described above, including combining scores of multiple deep learning neural networks, normalizing scores, and/or converting scores to probabilities.

At block 620, an iterative process is applied to the colon images to select images of colon polyps. In various embodiments, the iterative process may operate to decrease the chance that many images of the same polyp are selected and to increase the chance that images of different polyps are selected. As a capsule endoscopy device proceeds through the GIT, the device may obtain multiple images per second. Therefore, several images may contain the same colon polyp. In various embodiments, the iterative selection may attempt to decrease the chance that several images of the same polyp are selected. In various embodiments, the iterative selection may not attempt to do so and may select images of colon polyps even if they are likely to include the same polyp. Such embodiments are contemplated to be within the scope of the present disclosure.

Continuing with block 620, at each iteration, the image selector selects the image having the highest score/probability for presence of a polyp, and the selected image is referred to herein as a "seed image." In various embodiments where the operation attempts to decrease the chance that several images of the same polyp are selected, there are various ways to do so. For example, in the operation of block 620, a window may be applied to scores/probabilities of images that are around the seed image, and these scores/probabilities for images within the window are decreased. The window is used to identify images which may show the same polyp and to decrease the chance of such images being selected in subsequent iterations. The size of the window depends on various factors, such as the frame rate of the capsule endoscopy device. For example, a higher frame rate may correspond to a larger window, whereas a lower frame rate may correspond to a smaller window. A window that is too large may result in a nearby polyp not being selected in a subsequent iteration, while a window that is too narrow may result in multiple images of the same polyp being selected. Thus, the size of the window can be adjusted as appropriate to account for different circumstances and preferences.

The amount of score/probability decrease for images within the window can also vary. In various embodiments, the amount of decrease can be based on a value or based on a percentage. In various embodiments, scores/probabilities within the window can be decreased by the same value or same percentage. In various embodiments, scores/probabilities within the window can be decreased by different values or different percentages. In various embodiments, scores/probabilities of images that are closer in time to the seed image can be decreased by a larger value or percentage than scores/probabilities of images that are farther in time from the seed image. For example, the amounts of score/probability decrease within the window can correspond to a Gaussian function, a triangular function, a step function, or a rectangular function. Other functions for the score/probability decreases are contemplated to be within the scope of the present disclosure. At the end of each iteration, the seed image is removed from consideration by subsequent iterations, and the image selector iterates again.

Figure 7:
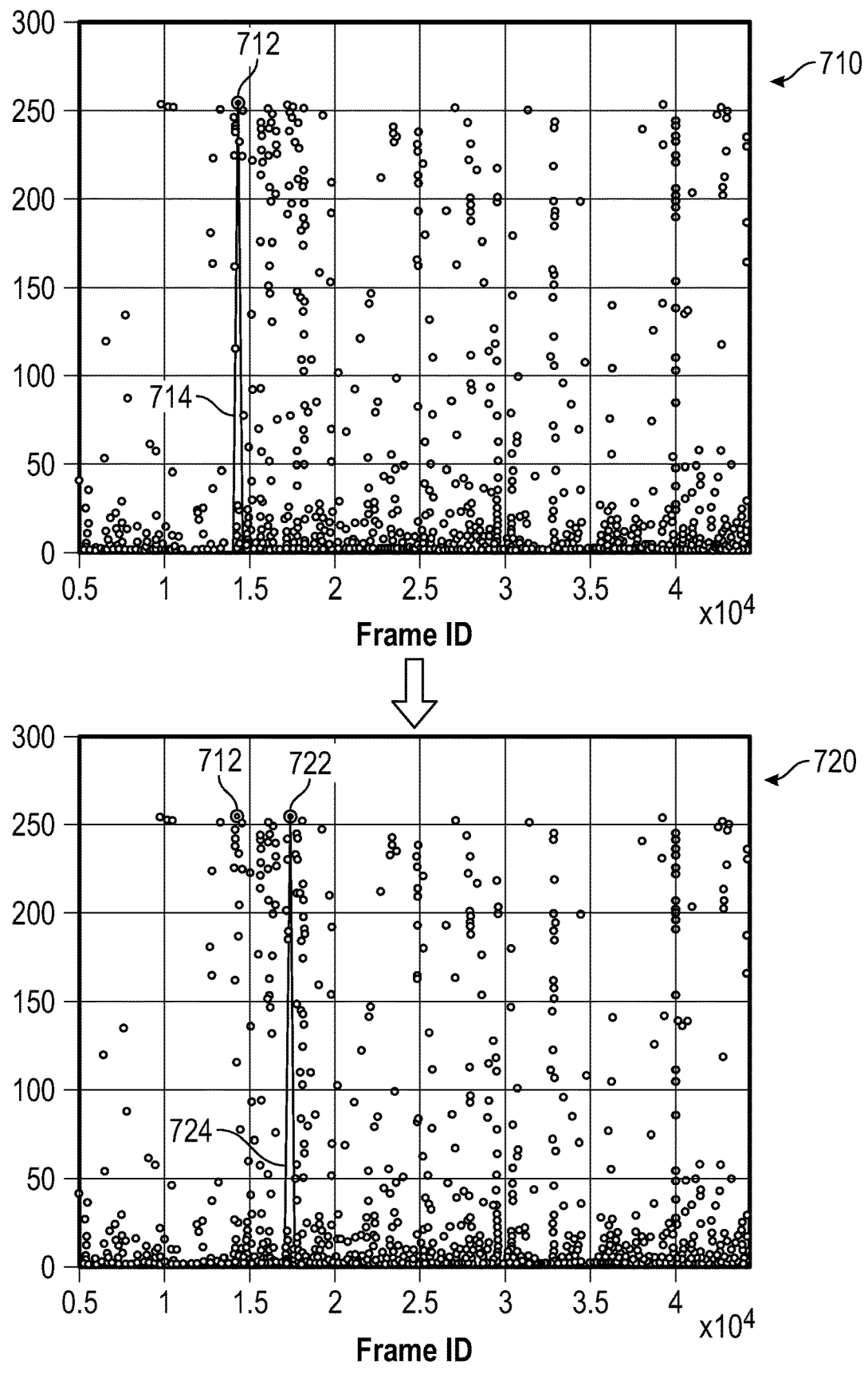
FIG. 7 is a diagram of two exemplary iterations of an iterative image selection process, in accordance with aspects of the disclosure.

An example of the image selection process is shown in FIG. 7. The top graph 710 of FIG. 7 shows scores for the presence of a colon polyp for each of about 45000 images/frames. In the first iteration, the image selector selects the image 712 having the highest score and applies a window 714 around the seed image 712. The scores for images within the window 714 are decreased, which decreases the chances of such images being selected in a subsequent iteration. The second iteration is shown by the bottom graph 720. In the second iteration, the image selection process selects the image 722 having the highest score/probability for presence of a colon polyp and applies a window 724 around the second seed image 722. The scores for images within the window 724 are decreased, and the process proceeds to the next iteration. As shown in the bottom graph of FIG. 7, the first seed image 712 and the second seed image 722 are about 5000 frames apart, and it is unlikely that those two seed images 712, 722 contain the same polyp. However, it is possible for subsequent iterations to select seed images containing the same polyp as the first seed image 712 or the second seed image 722.

Figure 8:
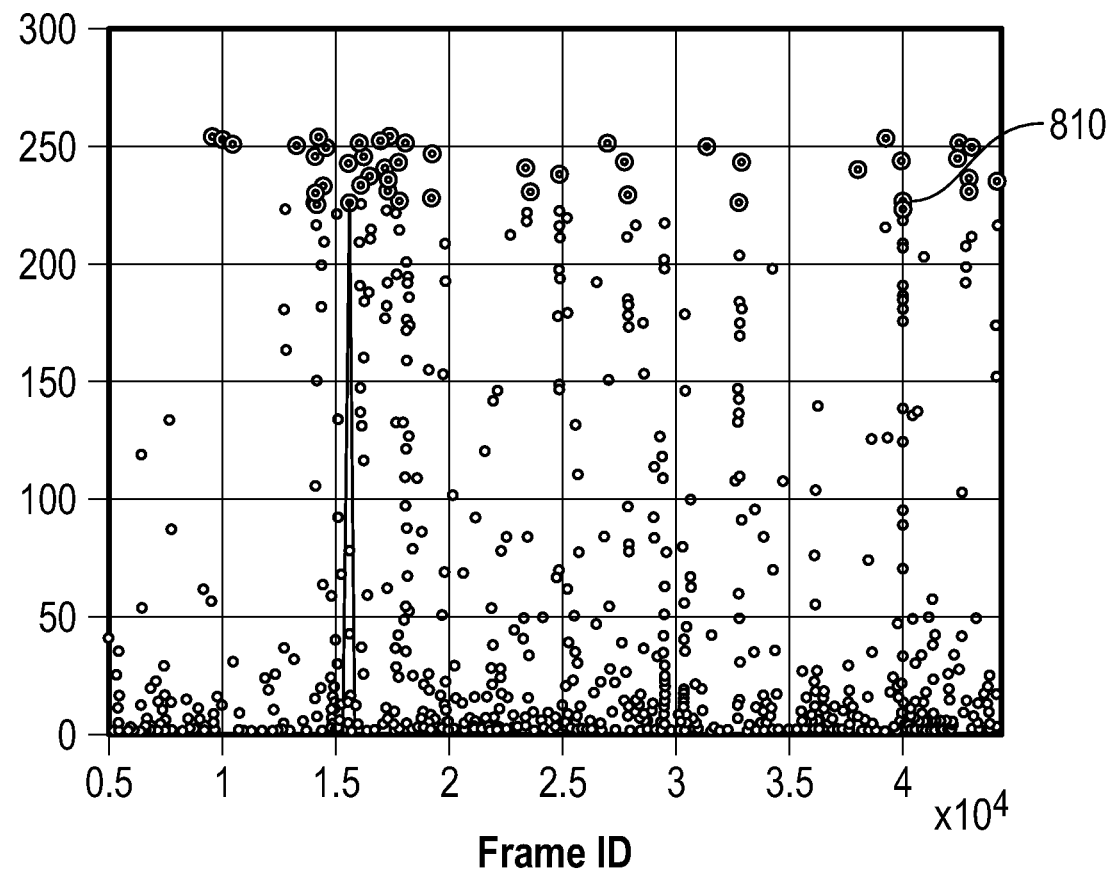
FIG. 8 is a diagram of a final iteration of an iterative image selection process, in accordance with aspects of the disclosure.

FIG. 8 shows an example of the end of the image selection process of block 620 (FIG. 6). Block 620 can end based on one or more criteria. For example, the iterative image selection process can terminate when no remaining image scores satisfy a score/probability threshold, such as a 95% probability-of-polyp threshold. As another example, the iterative image selection process can terminate when a particular number of seed images have been selected, such as one-hundred seed images. In various embodiments, either criterion can terminate the iterative selection process of block 620. Other criteria for terminating the iterative image selection process are contemplated to be within the scope of the present disclosure. Additionally, certain details of the image selection process of block 620 may be similar to the selection process described in International Application Publication No. WO2017199258. The entire contents of such International Application Publication are hereby incorporated by reference in its entirety, and they may be applicable to the image selection process of block 620.

With continuing reference to FIGS. 6 and 8, the result of block 620 is a collection of seed images. FIG. 8 shows that many seed images are clustered together, and it is possible that seed images in a cluster 810 may contain the same polyp.

Step 630 of FIG. 6 uses object tracking techniques to identify whether seed images close to each other may contain the same polyp. The object tracking technology of step 630 is referred to herein as a "consecutive-image tracker" to indicate that the tracking technology is designed to identify small changes in an object between consecutive images/frames. As mentioned above, the phrase "consecutive images" means images which, when ordered in a sequence, are adjacent to each other in the sequence. Such tracking technology includes optical flow techniques, for example. Persons skilled in the art will understand how to implement optical flow techniques. Other technologies for tracking objects in consecutive images are contemplated to be within the scope of the present disclosure.

Figure 9:
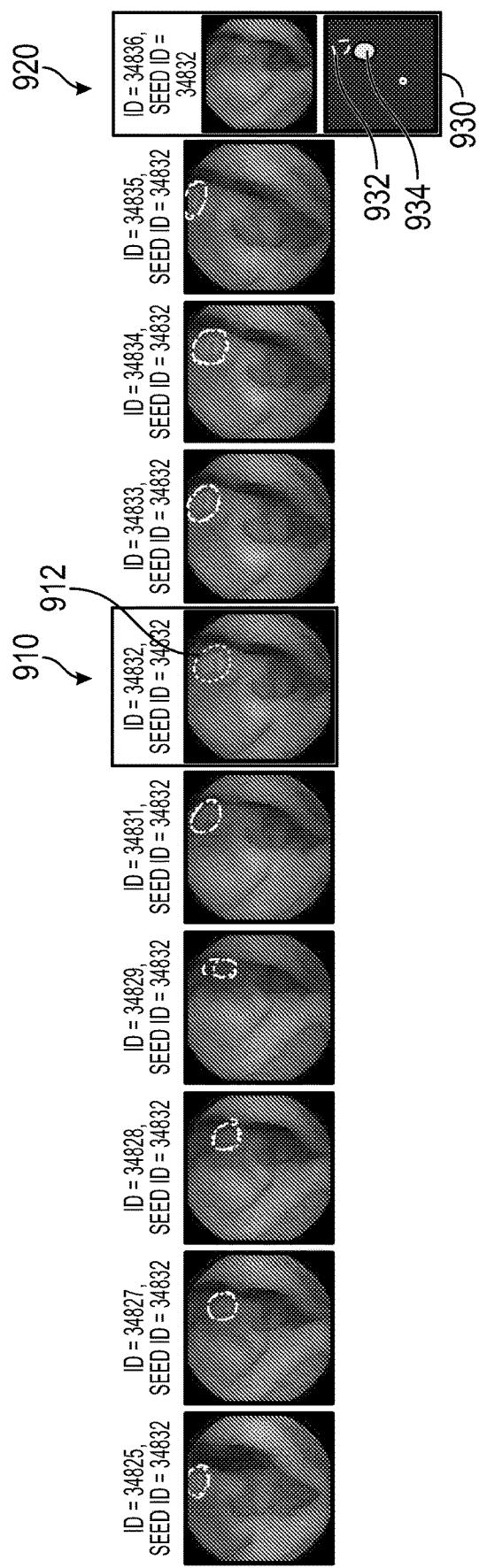
FIG. 9 is a diagram of an exemplary track of images stemming from a seed image, in accordance with aspects of the disclosure.

With continuing reference to FIG. 6, block 630 applies consecutive-image polyp tracking to each seed image identified by block 620. For each seed image, the consecutive-image polyp tracking is applied to consecutive images to track a polyp. FIG. 9 shows an example of the consecutive-image polyp tracking. Starting with the seed image 910, the consecutive-image polyp tracking processes adjacent images to track the polyp 912. In the illustrated example, the polyp 912 is tracked across five frames before the seed image 910 and across three frames after the seed image 910.

At the fourth frame 920 after the seed image 910, the tracking ends by operation of the tracking technology. A graphical representation 930 of the tracking technology shows that the expected location 932 of the polyp is off from the actual location 934 of a polyp. Therefore, the polyp 912 was not tracked to that frame 920. As used in connection with FIG. 9, the term "track" refers to a collection of consecutive frames across which a polyp in a seed image has been tracked by a consecutive-image tracker. A track includes the seed image. In FIG. 9, the collection of nine frames together forms a track. Generally, a "track" is not limited to polyps and, rather, refers to a collection of consecutive frames across which an event indicator in a seed image has been tracked by a consecutive-image tracker.

Figure 10:
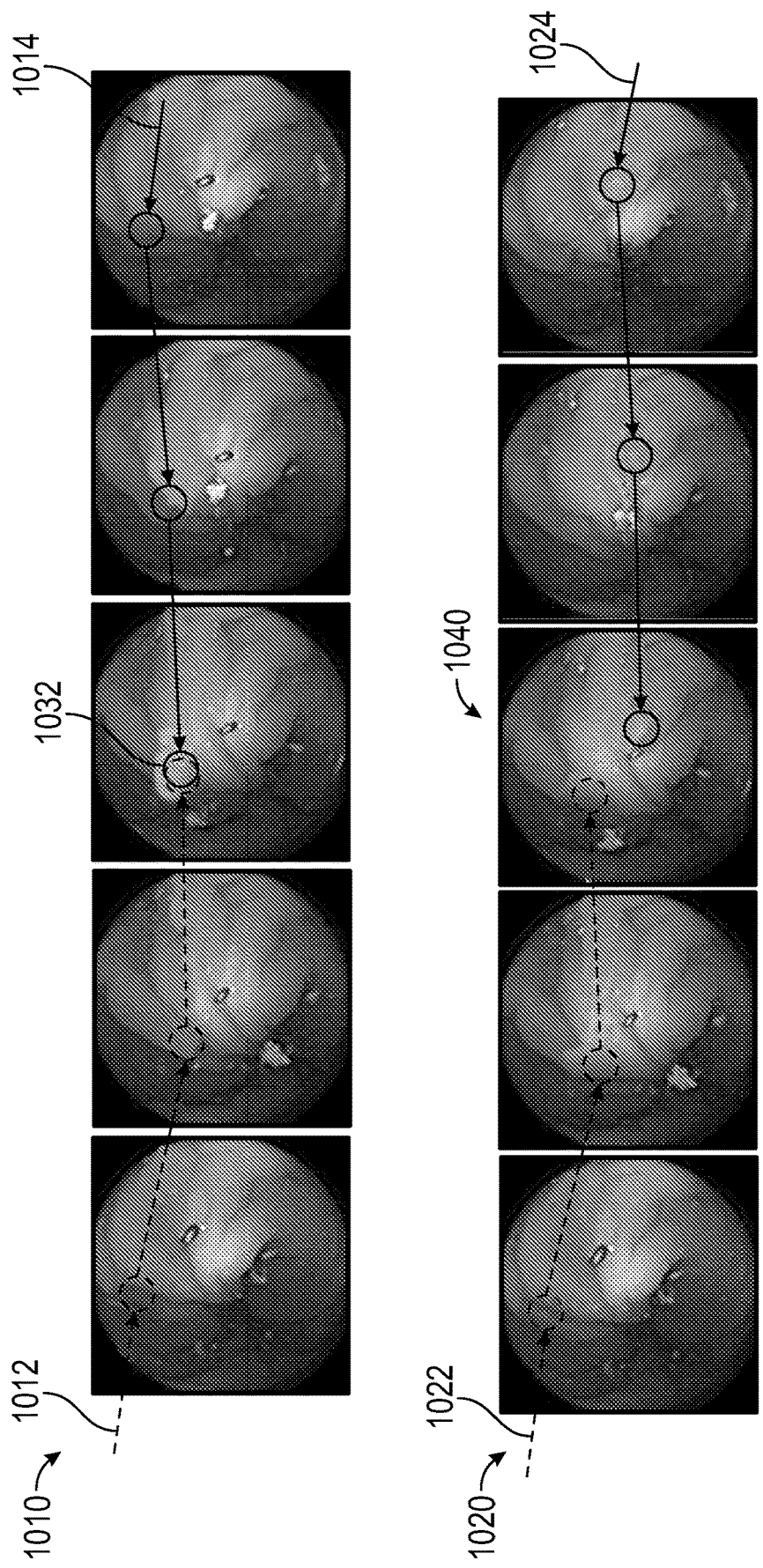
FIG. 10 is a diagram of exemplary tracks stemming from various seed images, in accordance with aspects of the disclosure.

Referring again to FIG. 6, the block 630 operates to identify a track for each seed image and to determine whether two or more tracks merge and may contain the same polyp, or determine whether any track includes two or more seed images, which would indicate that two or more seed images may contain the same polyp. FIG. 10 illustrates an example 1010 of two tracks which merge and may contain the same polyp and another example 1020 of two tracks which do not merge. A consecutive-image polyp tracker is applied to each seed image to identify a track for each seed image. In the top example 1010, a right-side seed image (not shown) results in a right-side track 1014 and a left-side seed image (not shown) results in a left-side track 1012. These two tracks 1012, 1014 in the top example 1010 merge because the consecutive-image tracker has tracked the same polyp 1032 in both tracks 1012, 1014. Therefore, when tracks merge, it is an indication that their respective seed images may contain the same polyp. In various embodiments, rather than determining whether two tracks merge, the disclosed operation can determine whether a track contains more than one seed image. In the top example 1010, both the left-side track 1012 and the right-side track 1014 would contain the left-side seed image and the right-side seed image (not shown).

The bottom example 1020 of FIG. 10 illustrates a scenario where two tracks 1022, 1024 do not merge. In particular, when the left-side track 1022 and the right-side track 1024 reach the center image 1040, the tracker technology expects the polyp to be at different locations. The center image 1040 may be part of the left-side track 1022 or may be part of the right-side track 1024. However, it cannot be part of both tracks 1022, 1024, which indicates that the two tracks 1022, 1024 do not merge. Therefore, when tracks do not merge, it is an indication that their respective seed images do not contain the same polyp.

In accordance with aspects of the present disclosure, if two or more tracks merge or if multiple seed images are part of the same track, block 630 of FIG. 6 operates to keep only one of the seed images in the merged tracks. For example, in the top example 1010 of FIG. 10, either the left-side seed image corresponding to the left-side track 1012 or the right-side seed image corresponding to the right-side track 1014 can be maintained as a seed image, while the other one is discarded as a seed image. Accordingly, block 630 of FIG. 6 operates to remove nearby seed images which may contain the same polyp and to attempt to maintain just one seed image from a cluster. This process of removing seed images which may contain the same polyp will be referred to herein as "deduplicating" seed images. The process of deduplicating seed images may be applied where the operation of block 620 selects seed images by attempting to decrease the chances of selecting seed images containing the same polyps, or where the operation of block 620 selects seed images without attempting to decrease the chances of selecting seed images containing the same polyps. The result of block 630 is a potentially smaller collection of deduplicated seed images, together with a track for each remaining seed image.

Referring again to FIG. 6, block 640 operates to potentially further deduplicate seed images in view of the possibility that a capsule endoscope device can reverse direction in a colon and capture images of the same polyp at a later time. In accordance with aspects of the present disclosure, block 640 operates to apply a consecutive-image tracker to seed images that result from block 630. The consecutive-image tracker may be applied to pairings of two or more seed images. If the consecutive-image tracker determines that a polyp can be tracked in the pairing of seed images, then the seed images may contain the same polyp and can be deduplicated. Accordingly, block 640 applies a consecutive-image tracker to non-consecutive images in a way that it was not designed to operate, and the result of block 640 is a potentially further reduced collection of seed images and a track of each remaining seed image. At block 650, the remaining seed images from block 640 and optionally their tracks are presented to a medical professional as potentially containing polyps. An image presentation in accordance with aspects of the present disclosure will be described in connection with FIG. 14.

The operation of FIG. 6 is exemplary and can be applied to event indicators other than colon polyps. Additionally, the operation of FIG. 6 can be applied to GIT segments other than an entire colon, such as a small bowel or such as individual segments of a colon. When applied to a small bowel, event indicators may include ulcers, angioectasia, diverticulum, tumors, small bowel masses, and small bowel polyps, among others. Such applications are contemplated to be within the scope of the present disclosure.

Figure 11:
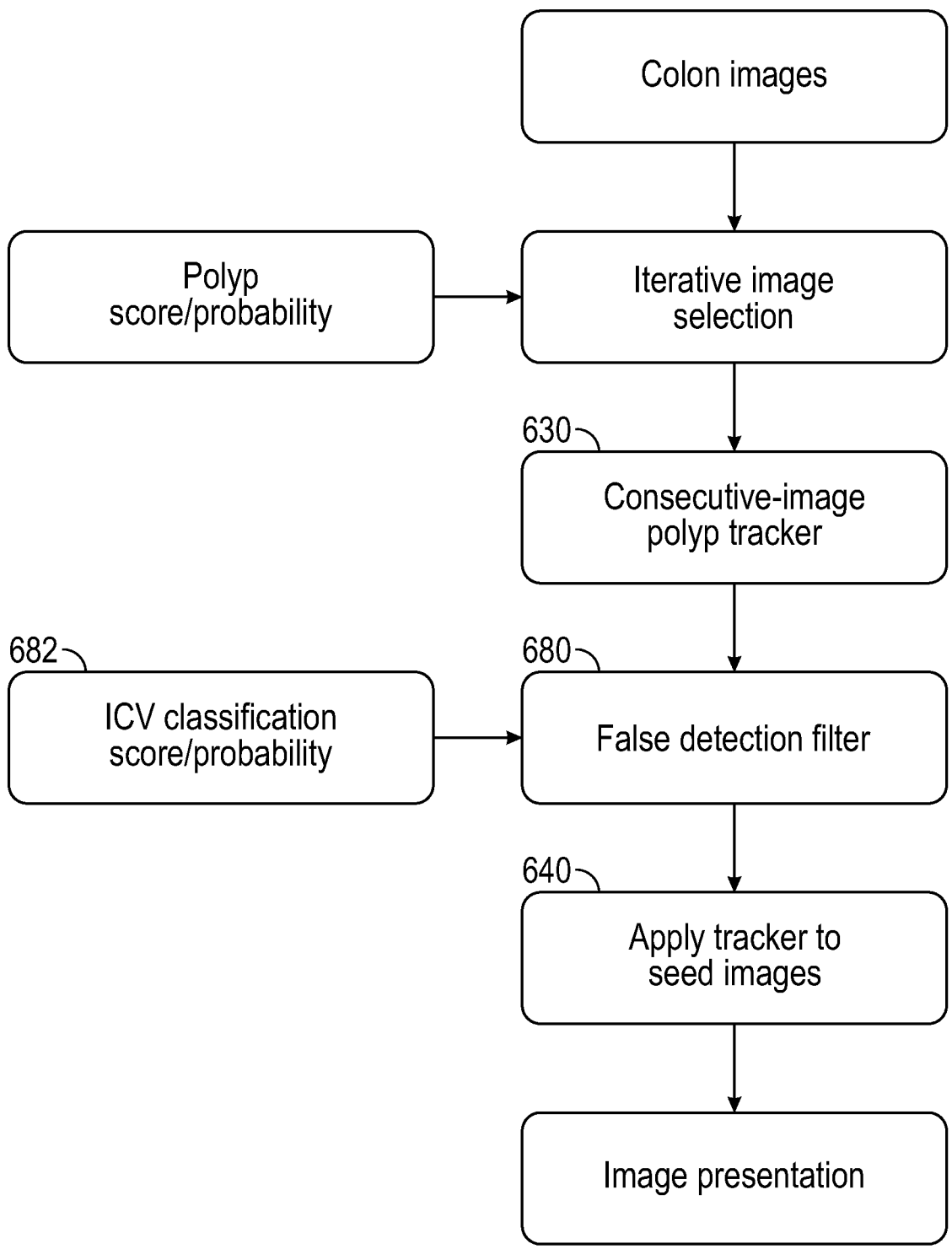
FIG. 11 is a diagram of an exemplary enhanced operation for selecting colon images which may contain a colon polyp, in accordance with aspects of the disclosure.

In accordance with aspects of the present disclosure, the operation of FIG. 6 can be enhanced in various ways. FIG. 11 shows one example of an enhancement that applies a false detection filter to identify and remove seed images which may contain an ileocecal valve (ICY) rather than a polyp. As persons skilled in the art will understand, an ICV and a polyp can be visually similar such that an ICY can be falsely detected to be a polyp. The operation of FIG. 11 applies an ICV false detection filter block 680 to results of the consecutive-image polyp tracking of block 630, which provides a collection of potentially deduplicated seed images and their tracks. The ICY false detection filter block 680 accesses ICV classification scores/probabilities 682 for each seed image and for the tracks corresponding to each seed image. In various embodiments, ICV classification scores can be generated using the deep learning neural network of FIG. 5 which provides scores for ICY and non-ICY and which is trained in a supervised manner. Then, a further logic can be used for transforming the classification scores into probabilities, such as a SoftMax logic, which persons skilled in the art will understand. A threshold may be then set for the ICV probability such that an image will be classified as containing an ICV only if the ICV probability is above the threshold. For example, because it may be difficult to identify ICV, the threshold can be set such that only images which are significantly probable to be ICY images would be classified as an ICV image.

In block 680, if a polyp in an image has a sufficiently high probability of being an ICV based on comparing the ICY classification score/probability 682 to a threshold value (such as a 95% ICV-presence-probability threshold), the image is considered to be a polyp false detection. In accordance with aspects of the present disclosure, when an image of a track is considered to be a polyp false detection, the entire track and its corresponding seed image are discarded and are not passed to block 640 of FIG. 11. Because the track is generated by consecutive-image tracking in block 630, a determination that one image may be a false detection indicates that the entire track may be a false detection. Accordingly, the enhancement of FIG. 11 applies an approach of removing a seed image if any image in its track may be a false detection. The illustration of FIG. 11 is exemplary, and the disclosed concepts can be applied to GIT portions other than the colon, to event indicators other than a polyp, and to false detection filters other than an ICV. Such applications are contemplated to be within the scope of the present disclosure.

Figure 12:
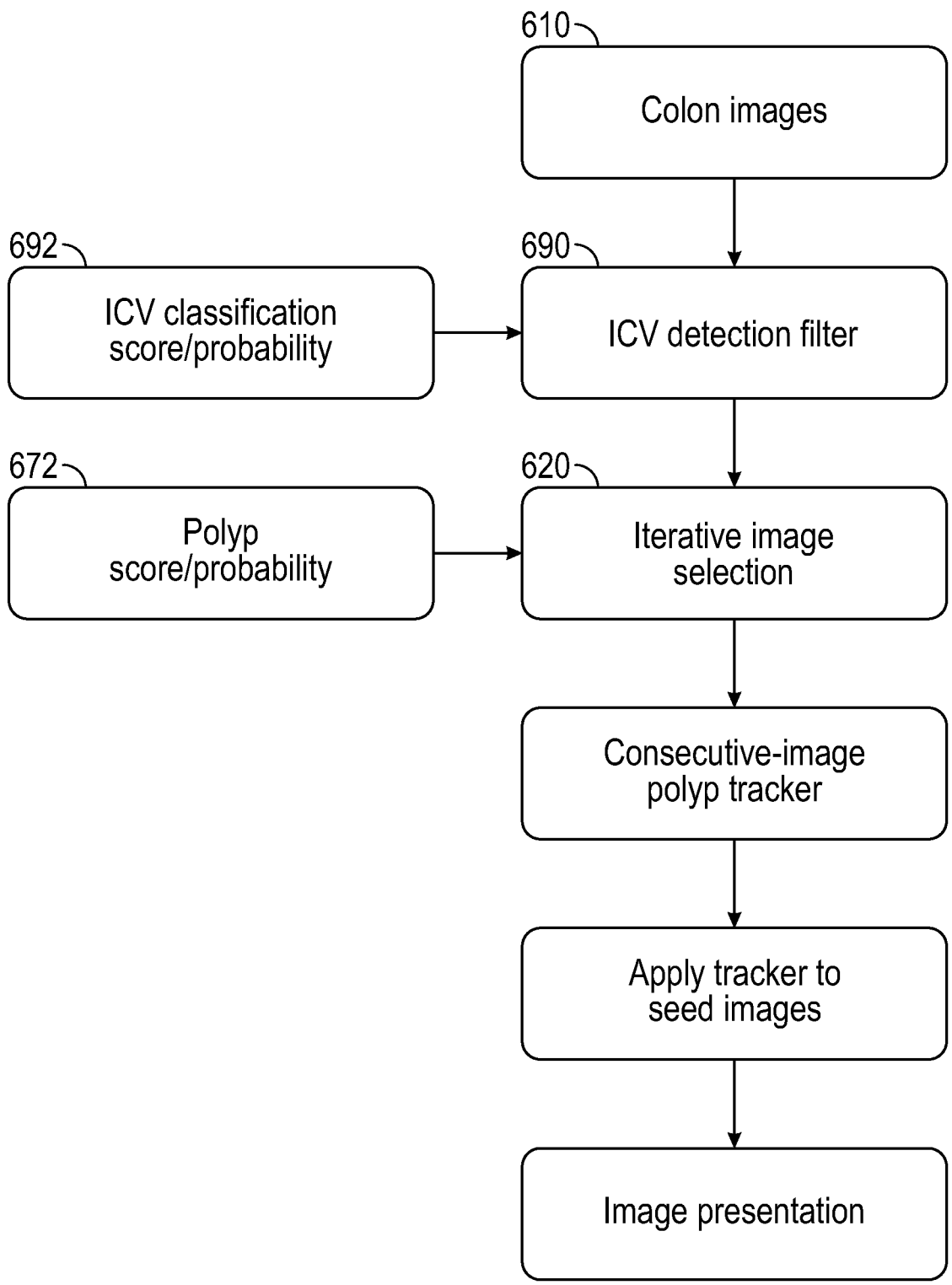
FIG. 12 is a diagram of another exemplary enhanced operation for selecting colon images which may contain a colon polyp, in accordance with aspects of the disclosure.

FIG. 12 shows an example of another enhancement that applies an ICV detection filter 690 to identify and remove, at the outset, colon images which may contain an ileocecal valve (ICV). The operation of FIG. 12 applies an ICV detection filter block 690 to all colon images provided by block 610. The ICV detection filter block 690 operates to remove any colon image which has a sufficiently high probability of being an ICY based on comparing the ICV classification score/probability 692 to a threshold value. The result of block 690 is a potentially reduced set of colon images which most likely do not include images of an ICV. The iterative image selection process of block 620 can be applied to the reduced set of colon images from block 690. The enhancement of FIG. 12 is based on recognizing the possibility that ICV classification scores/probabilities themselves may have false positives, such that removing an entire track, as in FIG. 11, may be overly aggressive. The enhancement of FIG. 12 is less aggressive because it leaves the possibility that seed images may contain an ICY that is misclassified as a polyp. Whether the enhancement of FIG. 11 or the enhancement of FIG. 12 is applied can depend on a medical professional's level of experience in distinguishing ICV and polyps and/or preference for a more aggressive or a less aggressive enhancement. In various embodiments, the ICY detection filter block 690 can be modified to simultaneously consider polyp score/probability 672 and the ICV classification score/probability 692. If an image has sufficiently high score/probability of containing a polyp as well as an ICY, it is possible that the polyp is located near the ICV such that both appear in an image. In that case, the image may be maintained and not discarded. The illustration of FIG. 12 is exemplary, and the disclosed concepts can be applied to GIT portions other than the colon, to event indicators other than a polyp, and to false detection filters other than an ICY. Such applications are contemplated to be within the scope of the present disclosure.

Figure 13:
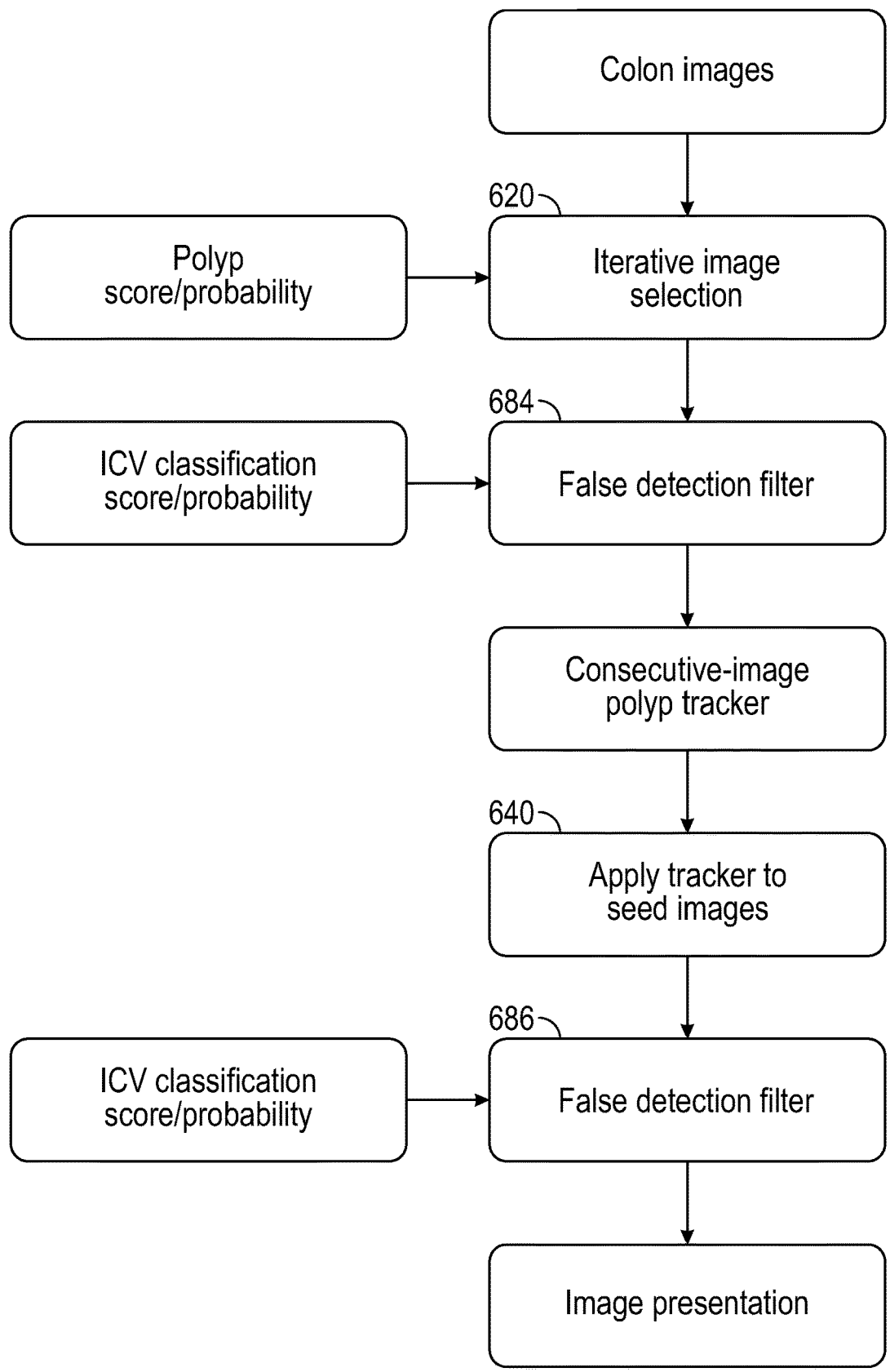
FIG. 13 is a diagram of yet another exemplary enhanced operation for selecting colon images which may contain a colon polyp, in accordance with aspects of the disclosure.

FIG. 13 shows an example of another enhancement that applies a false detection filter to identify and remove seed images which may contain an ileocecal valve (ICV) rather than a polyp. The false detection filter block 684 can be applied to the result of block 620, which provides a collection of seed images, and can be applied before any tracks are generated for the seed images. Thus, the false detection filter block 684 is applied only to seed images. If any seed image has a sufficiently high probability of containing an ICY, the seed image is removed and is not passed to the consecutive-image tracker. Alternatively or additionally, in FIG. 13, a false detection filter block 686 can be applied to the result of block 640, which provides a collection of potentially deduplicated seed images and their tracks. In various embodiments, the false detection filter block 686 can be applied just to seed images in the same manner as filter block 684. In various embodiments, the filter block 686 can be applied to every image in a track in the same manner as the operation of FIG. 11. Different approaches for the false detection filter blocks 684 and 686 are contemplated to be within the scope of the present disclosure.

The embodiments of FIGS. 11-13 are merely illustrative. The same aspects can be applied to event indicators other than polyps and can be applied to GIT portions other than a colon. Additionally, the false detection filter can be applied for types of false detection other than ICY. Such applications and variations are contemplated to be within the scope of the present disclosure.

Accordingly, the description above provides systems and methods for presenting a medical professional with a greatly reduced set of images that are likely to contain event indicators. The greatly reduced set of images can significantly reduce a medical professional's fatigue in reviewing images and can improve the professional's focus and accuracy in evaluating a potential pathology. The following describes an example of a display screen and user interface for presenting the images.

According to some aspects, a study of a CE procedure may be generated based on the systems and methods of the present application. According to some aspects, at least a portion of the images included in a study of a CE procedure are selected according to the systems and methods of the present application. According to some aspects, the remaining seed images and optionally their tracks may be included in the study of the related CE procedure. According to some aspects, the remaining seed images and optionally their tracks are or form the images included in the study of the related CE procedure.

Figure 14:
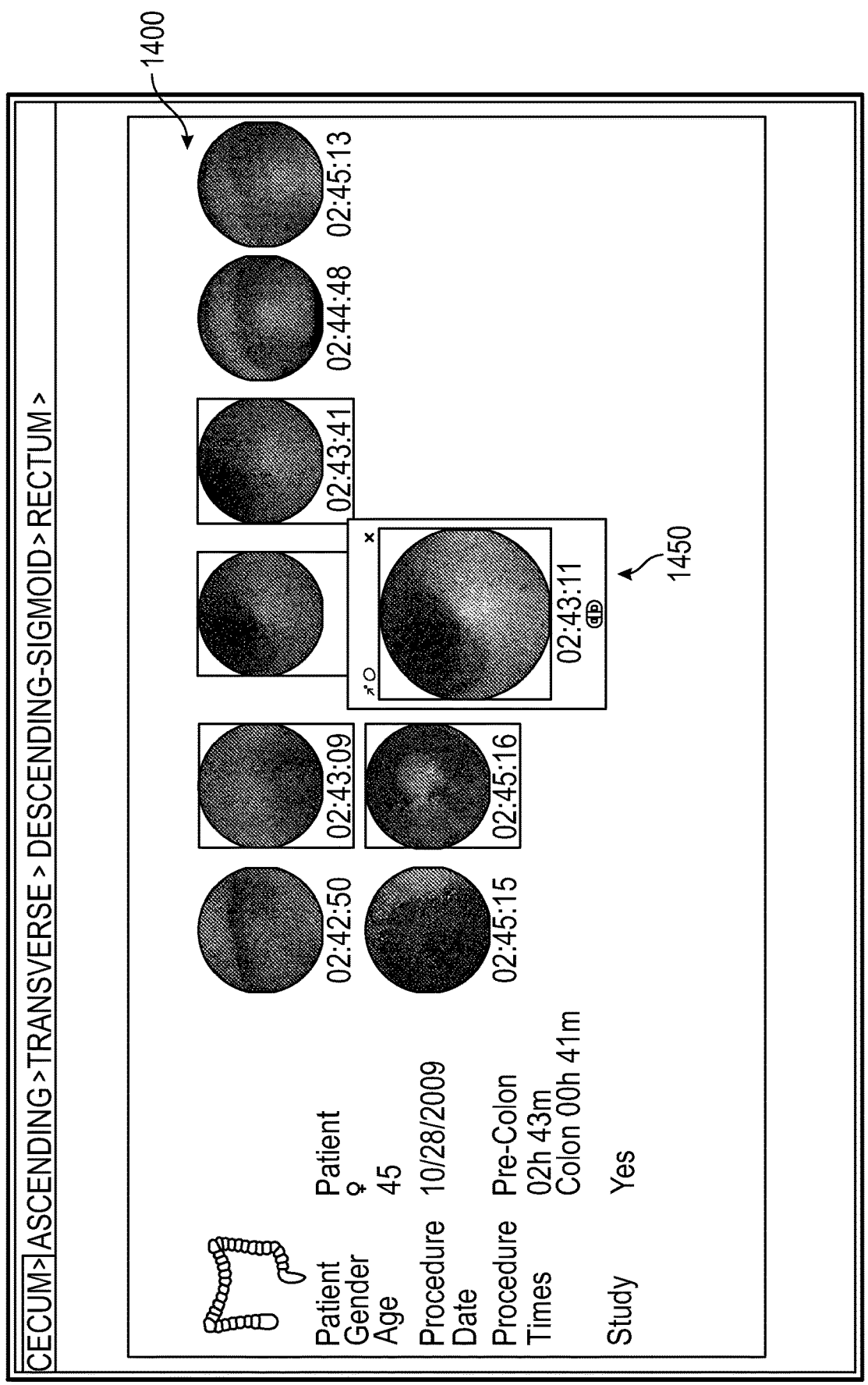
FIG. 14 shows an exemplary screen of a display or view, in accordance with aspects of the present disclosure.

FIG. 14 shows a screen of an exemplary display of a study generated based on the systems and methods of the present application. A GUI (or a study viewing application) may be used for displaying a study for a user's review and for generating a study report (or a CE procedure report). The study may be generated based on or may represent one or more predefined event indicators. The screen of FIG. 14 displays a set of still images 1400 included in the study. Images 1400 are selected according to the systems and methods of the present application. The user may review images 1450 and select one or more images of images 1450 which are of interest, e.g., displaying the one or more predefined event indicators. For example, the SB may include a plurality of pathologies of interest, including: ulcers, polyps, strictures etc. These pathologies may be predefined as event indicators for generating a study based on the present systems and methods. According to some aspects, a set of seed images and, optionally, related tracks may be selected for each pathology according to the present systems and methods. The set of seed images may be included in the procedure study or may constitute all of the images included in the study. According to some aspects, a further selection method may be applied to select images to be included or form the images of the study from the sets of seed images. According to some aspects, a set of seed images and, optionally, related tracks may be selected for all the pathologies together, resulting in a set of seed images referring to all of the pathologies. As another example, in a colon procedure aimed for cancer screening, polyps may be of interest. FIG. 14 shows a display of a study of such colon procedure. The study images are displayed according to their location in the colon. The location may be any one of the following five anatomical colon segments: cecum, ascending, transverse, descending-sigmoid and rectum. The screen shows study images identified to be located in the cecum. The user may switch between display of images located in the different segments. The illustrated display screen may be used by the user, e.g., a clinician, to select the images to be included in the study report. The illustrated display screen is exemplary, and variations are contemplated to be within the scope of the present disclosure. In some embodiments, the study may also include the tracks associated with the seed images (i.e., the study seed images). In such a case, a user may request (via user input) to display a track related to a displayed image, e.g., the image in-focus. By reviewing the associated track, the clinician may receive further information relating to the seed image, which may assist him in determining if the seed image (or optionally any other track image) is of interest.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described operations, methods, programs, algorithms, or codes may be converted to, or expressed in, a programming language or computer program embodied on a computer or machine readable medium. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other metalanguages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. To the extent consistent, any or all of the aspects detailed herein may be used in conjunction with any or all of the other aspects detailed herein. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A system for selecting images of an event indicator, the system comprising:
    at least one processor; and
    at least one memory storing instructions which, when executed by the at least one processor, cause the system to:
        access a plurality of images of at least a portion of a gastrointestinal tract (GIT) captured by a capsule endoscopy device;
        for each image of the plurality of images, access one or more scores for indicating a presence of an event indicator;
        select a plurality of seed images from among the plurality of images based on the one or more scores;
        deduplicate the plurality of seed images for images showing a same occurrence of the event indicator, the deduplicating utilizing a consecutive-image tracker; and
        present the deduplicated seed images in a graphical user interface to display potential occurrences of the event indicator,
        wherein the plurality of seed images comprises first and second non-consecutive seed images,
        wherein the deduplicating utilizing the consecutive-image tracker comprises:
            applying the consecutive-image tracker to the first and second non-consecutive seed images to determine whether an occurrence of an event indicator is tracked across the first and second non-consecutive seed images;
            in a case an occurrence of an event indicator is tracked across the first and second non-consecutive seed images, removing one of the first and second non-consecutive seed images as a seed image; and
            in a case an occurrence of an event indicator is not tracked across the first and second non-consecutive seed images, keeping both the first and second non-consecutive seed images as seed images.

2. The system of claim 1, wherein in deduplicating the plurality of seed images, the instructions, when executed by the at least one processor, cause the system to:
    for each seed image of the plurality seed images: identify, using the consecutive-image tracker, a track for an occurrence of an event indicator stemming from the seed image;
    determine whether two tracks among the tracks merge together; and
    in a case the two tracks merge together, retain only one track of the two tracks and the seed image corresponding to the one track.

3. The system of claim 2, wherein the instructions, when executed by the at least one processor, further cause the system to:
accessing a false detection filter result for each image of the tracks;
determine that a track among the tracks contains a false detection of an occurrence of the event indicator; and
remove the track containing the false detection and the seed image corresponding to the track containing the false detection.

4. The system of claim 3, wherein the event indicator is a colon polyp, wherein the false detection filter is an ileocecal valve detector, and wherein the false detection is an incorrect classification of an ileocecal valve as a colon polyp.

5. The system of claim 1, wherein in deduplicating the plurality of seed images, the instructions, when executed by the at least one processor, cause the system to:
apply the consecutive-image tracker to at least two seed images of the plurality of seed images which are not contained in a same track;
determine, based on the consecutive-image tracker, whether a same occurrence of the event indicator is tracked in the at least two seed images; and
in a case the same occurrence of the event indicator is tracked in the at least two seed images, retain only one seed image of the at least two seed images to deduplicate the at least two seed images.

6. A computer-implemented method for selecting images of an event indicator, the method comprising:
accessing a plurality of images of at least a portion of a gastrointestinal tract (GIT) captured by a capsule endoscopy device;
for each image of the plurality of images, accessing one or more scores indicating a presence of an event indicator;
selecting a plurality of seed images from among the plurality of images based on the one or more scores;
deduplicating the plurality of seed images for images showing a same occurrence of the event indicator, the deduplicating utilizing a consecutive-image tracker; and
presenting the deduplicated seed images in a graphical user interface to display potential occurrences of the event indicator,
wherein the plurality of seed images comprises first and second non-consecutive seed images,
wherein the deduplicating utilizing the consecutive-image tracker comprises:
applying the consecutive-image tracker to the first and second non-consecutive seed images to determine whether an occurrence of an event indicator is tracked across the first and second non-consecutive seed images;
in a case an occurrence of an event indicator is tracked across the first and second non-consecutive seed images, removing one of the first and second non-consecutive seed images as a seed image; and
in a case an occurrence of an event indicator is not tracked across the first and second non-consecutive seed images, keeping both the first and second non-consecutive seed images as seed images.

7. The computer-implemented method of claim 6, wherein deduplicating the plurality of seed images includes:
for each seed image of the plurality seed images: identifying, using the consecutive-image tracker, a track for an occurrence of an event indicator stemming from the seed image;
determining whether two tracks among the tracks merge together; and
in a case the two tracks merge together, retaining only one track of the two tracks and the seed image corresponding to the one track.

8. The computer-implemented method of claim 7, further comprising:
accessing a false detection filter result for each image of the tracks;
determining that a track among the tracks contains a false detection of an occurrence of the event indicator; and
removing the track containing the false detection and the seed image corresponding to the track containing the false detection.

9. The computer-implemented method of claim 8, wherein the event indicator is a colon polyp, wherein the false detection filter is an ileocecal valve detector, and wherein the false detection is an incorrect classification of an ileocecal valve as a colon polyp.

10. The computer-implemented method of claim 6, wherein deduplicating the plurality of seed images further includes:
applying the consecutive-image tracker to at least two seed images of the plurality of seed images which are not contained in a same track;
determining, based on the consecutive-image tracker, whether a same occurrence of the event indicator is tracked in the at least two seed images; and
in a case the same occurrence of the event indicator is tracked in the at least two seed images, retaining only one seed image of the at least two seed images to deduplicate the at least two seed images.

11. A non-transitory computer readable medium storing machine readable instructions which, when executed by at least one processor of a system, causes the system to perform a process comprising:
accessing a plurality of images of at least a portion of a gastrointestinal tract (GIT) captured by a capsule endoscopy device;
for each image of the plurality of images, accessing one or more scores indicating a presence of an event indicator;
selecting a plurality of seed images from among the plurality of images based on the one or more scores;
deduplicating the plurality of seed images for images showing a same occurrence of the event indicator, the deduplicating utilizing a consecutive-image tracker; and
presenting the deduplicated seed images in a graphical user interface to display potential occurrences of the event indicator,
wherein the plurality of seed images comprises first and second non-consecutive seed images,
wherein the deduplicating utilizing the consecutive-image tracker comprises:
applying the consecutive-image tracker to the first and second non-consecutive seed images to determine whether an occurrence of an event indicator is tracked across the first and second non-consecutive seed images;
in a case an occurrence of an event indicator is tracked across the first and second non-consecutive seed images, removing one of the first and second non-consecutive seed images as a seed image; and in a case an occurrence of an event indicator is not tracked across the first and second non-consecutive seed images, keeping both the first and second non-consecutive seed images as seed images.

12. The non-transitory computer readable medium of claim 11, wherein in deduplicating the plurality of seed images, the instructions, when executed by the at least one processor, cause the system to:

for each seed image of the plurality seed images: identify, using the consecutive-image tracker, a track for an occurrence of an event indicator stemming from the seed image;

determine whether two tracks among the tracks merge together; and in a case the two tracks merge together, retain only one track of the two tracks and the seed image corresponding to the one track.

13. The non-transitory computer readable medium of claim 12, wherein the instructions, when executed by the at least one processor, cause the system to perform further operations comprising:

accessing a false detection filter result for each image of the tracks;

determining that a track among the tracks contains a false detection of an occurrence of the event indicator; and removing the track containing the false detection and the seed image corresponding to the track containing the false detection.

14. The non-transitory computer readable medium of claim 13, wherein the event indicator is a colon polyp, wherein the false detection filter is an ileocecal valve detector, and wherein the false detection is an incorrect classification of an ileocecal valve as a colon polyp.

15. The non-transitory computer readable medium of claim 11, wherein in deduplicating the plurality of seed images, the instructions, when executed by the at least one processor, cause the system to:

apply the consecutive-image tracker to at least two seed images of the plurality of seed images which are not contained in a same track;

determine, based on the consecutive-image tracker, whether a same occurrence of the event indicator is tracked in the at least two seed images; and in a case the same occurrence of the event indicator is tracked in the at least two seed images, retain only one seed image of the at least two seed images to deduplicate the at least two seed images.

* * * * *